(12) United States Patent
Hornkvist et al.

(10) Patent No.: US 10,885,039 B2
(45) Date of Patent: Jan. 5, 2021

(54) MACHINE LEARNING BASED SEARCH IMPROVEMENT

(71) Applicant: Apple Inc., Cupertino, CA (US)

(72) Inventors: John M. Hornkvist, Cupertino, CA (US); Gaurav Kapoor, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 510 days.

(21) Appl. No.: 14/721,945

(22) Filed: May 26, 2015

(65) Prior Publication Data
US 2015/0347519 A1    Dec. 3, 2015

Related U.S. Application Data

(60) Provisional application No. 62/005,985, filed on May 30, 2014.

(51) Int. Cl.
*G06F 16/2457* (2019.01)
*G06F 16/9535* (2019.01)
(Continued)

(52) U.S. Cl.
CPC ...... *G06F 16/2457* (2019.01); *G06F 16/9535* (2019.01); *G06F 16/9537* (2019.01); *G06N 20/00* (2019.01)

(58) Field of Classification Search
CPC ......... G06F 17/30867; G06F 17/30864; G06F 17/30699
(Continued)

(56) References Cited

U.S. PATENT DOCUMENTS 6,571,239 B1   5/2003 Cole et al.
6,775,664 B2   8/2004 Lang et al.
(Continued)

FOREIGN PATENT DOCUMENTS

EP    1 647 903         4/2006
EP    1647903 A1        4/2006

OTHER PUBLICATIONS

Notification Concerning Transmittal of the International Search Report and the Written Opinion for International Application No. PCT/US2016/023284, dated Jun. 14, 2016, 11 pages.
(Continued)

*Primary Examiner* — Ken Hoang
(74) *Attorney, Agent, or Firm* — Womble Bond Dickinson (US) LLP

(57) ABSTRACT

Systems and methods are disclosed for improving search results returned to a user from one or more search domains, utilizing query features learned locally on the user's device. A search engine can receive, analyze and forward query results from multiple search domains and pass the query results to a client device. A search engine can determine a feature by analyzing query results, generate a predictor for the feature, instruct a client device to use the predictor to train on the feature, and report back to the search engine on training progress. A search engine can instruct a first and second set of client devices to train on set A and B of predictors, respectively, and report back training progress to the search engine. A client device can store search session context and share the context with a search engine between sessions with one or more search engines. A synchronization system can synchronize local predictors between multiple client devices of a user.

23 Claims, 13 Drawing Sheets

(51) Int. Cl.
*G06F 16/9537* (2019.01)
*G06N 20/00* (2019.01)

(58) Field of Classification Search
USPC ....... 709/204, 206, 231, 217, 219, 227, 205;
707/706, 722, 737, 766, E17.108, 723,
707/769, E17.001, E17.005, E17.014,
707/E17.075, E17.084, E17.109, 608,
707/634, 635, 705, 711, 728, 732, 741,
707/754, 776
See application file for complete search history.

(56) References Cited

U.S. PATENT DOCUMENTS

| | | | |
|---|---|---|---|
| 8,131,716 B2 | 3/2012 | Chevalier et al. | |
| 8,359,319 B2 * | 1/2013 | Pendse | G06F 17/30867 707/748 |
| 8,504,583 B1 | 8/2013 | Ke et al. | |
| 8,543,668 B1 * | 9/2013 | Long | G06F 17/2235 709/219 |
| 8,583,675 B1 * | 11/2013 | Haahr | G06F 17/30442 707/721 |
| 8,639,679 B1 | 1/2014 | Zhou | |
| 8,650,173 B2 | 2/2014 | McDonald et al. | |
| 9,462,313 B1 * | 10/2016 | Sbaiz | H04N 21/25891 |
| 2003/0050923 A1 * | 3/2003 | Chang | G06F 17/30967 |
| 2003/0217052 A1 | 11/2003 | Rubenczyk et al. | |
| 2005/0149498 A1 * | 7/2005 | Lawrence | G06F 17/30864 |
| 2005/0149500 A1 * | 7/2005 | Marmaros | G06F 17/30864 |
| 2005/0283473 A1 | 12/2005 | Rousso et al. | |
| 2006/0074883 A1 * | 4/2006 | Teevan | G06F 16/9535 |
| 2006/0224579 A1 * | 10/2006 | Zheng | G06F 17/30864 |
| 2007/0143260 A1 * | 6/2007 | Markov | G06Q 30/02 |
| 2008/0235204 A1 | 9/2008 | Dai et al. | |
| 2009/0024546 A1 | 1/2009 | Ficcaglia et al. | |
| 2010/0023502 A1 | 1/2010 | Marlow | |
| 2011/0010367 A1 | 1/2011 | Jockish et al. | |
| 2011/0066607 A1 | 3/2011 | Wong | |
| 2013/0246383 A1 * | 9/2013 | White | G06F 17/30867 707/706 |
| 2014/0059042 A1 | 2/2014 | Vinay et al. | |
| 2014/0136543 A1 | 5/2014 | Frieden et al. | |
| 2014/0282136 A1 * | 9/2014 | Marantz | G06F 3/0484 715/764 |
| 2015/0242760 A1 * | 8/2015 | Miao | H04L 67/42 706/12 |
| 2015/0347594 A1 | 12/2015 | Hornkvist et al. | |

OTHER PUBLICATIONS

Alessandro Bozzon, et al. "Liquid Query: Multi-Domain Exploratory Search on the Web", WWW 2010, Apr. 26-30, 2010, pp. 161-170, ACM, Raleigh, North Carolina, USA.
Xiaohui Long, et al. "Three-Level Caching for Efficient Query Processing in Large Web Search Engines", World Wide Web (2006) 9: 369-395.
PCT Chapter I International Preliminary Report on Patentability (IPER) for PCT Application No. PCT/US2016/023284 dated Dec. 7, 2017, 8 pages.

* cited by examiner

MACHINE LEARNING BASED SEARCH IMPROVEMENT

RELATED APPLICATIONS

The present U.S. patent application claims priority under 35 U.S.C. § 119(e) to the following U.S. patent application which is incorporated herein by reference to the extent it is consistent with this disclosure:
(1) Application No. 62/005,985, filed May 30, 2014 entitled, "MULTI-DOMAIN SEARCH ON A COMPUTING DEVICE;"

The present U.S. application is related to the following applications, each of which is incorporated herein by reference to the extent they are consistent with this disclosure:
(1) Application No. 62/005,996, filed May 30, 2014, entitled "MULTI-DOMAIN QUERY COMPLETION;"
(2) Application No. 62/005,996, filed Sep. 30, 2014, entitled "MULTI-DOMAIN QUERY COMPLETION;"
(3) Application No. 62/006,000, filed May 30, 2014, entitled "USE OF USER FEEDBACK IN A CITATION SEARCH INDEX;"
(4) Application No. 62/006,000, filed Sep. 30, 2014, entitled "USE OF USER FEEDBACK IN A CITATION SEARCH INDEX;"
(5) Application No. 62/006,001, filed May 30, 2014, entitled "FEDERATED SEARCH;"
(6) Application No. 62/006,001, filed Sep. 30, 2014, entitled "FEDERATED SEARCH;"
(7) Application No. 62/044,176, filed Aug. 29, 2014, entitled "REDUCED RESOLUTION LOCATION DETERMINATION FOR IMPROVED ANONYMITY OF USER LOCATION;"
(8) application Ser. No. 14/502,869, filed Sep. 30, 2014, entitled "REDUCED RESOLUTION LOCATION DETERMINATION FOR IMPROVED ANONYMITY OF USER LOCATION;" and
(9) application Ser. No. 14/502,881, filed Sep. 30, 2014, entitled "MULTI-DOMAIN SEARCH ON A COMPUTING DEVICE."

TECHNICAL FIELD

This disclosure relates to the field of improving the relevance of search results returned to a user in response to a search query.

BACKGROUND

A user of a computing system, entering a query into a search engine, wants to receive query results that are relevant to the user. Whether the results returned by the search engine are relevant to the particular user entering the query is a subjective view of the particular user entering the query. Therefore, the more information that the search engine can gather about the particular user, the more likely it is that the search engine will return results that are relevant to the particular user. However, gathering information about particular users raises privacy concerns.

SUMMARY OF THE DESCRIPTION

Embodiments are described for improving search results returned to a user from a local database of private information and/or results returned by a remote search engine from one or more search domains, by utilizing local learning on a client device combined with learning by the remote search engine. Local, private data is very useful in determining the type of search results that are relevant to this particular user. A remote search engine collects and stores a great quantity of "crowd-source" data that includes queries and interactions with query results of many users. Crowd-source data generates results that are intended to be relevant to most users, but might not be the most relevant for a particular user. Systems and methods disclosed herein can improve the relevance of both local and remote search results returned to a user in response to a query by enhancing local learning on a client device with the learning of a remote search engine that is based on crowd-source data, and similarly enhancing remote search engine learning with the local learning of the preferences of a particular user.

In one embodiment, the relevance of the local search results or the remote search results or both search results can be improved by using sensor data (e.g. local sensors on the client device, such as GPS or WiFi receivers or ambient light sensors or accelerometers, etc.) to sort or filter the search results. Moreover, in one embodiment, the relevance of the one or both such search results can be improved by using client device state data (e.g. which applications are in use or front-most, calendar event data, contacts in an address book, etc.) to sort or filter one or both search results. Furthermore, in one embodiment, both the client side machine learning and the server side (remote) machine learning can be improved using this two-part model in combination with both the sensor data (e.g. location derived from received WiFi signals) and the client device state data, and this improved machine learning done at both parts of the two part model can be used to improve the situational relevance of the results based on the sensor data the client device state data.

In one embodiment, a client device includes an initial set of one or more predictors that can learn from a user's queries and the user's interaction with both local and remote search query results. In an embodiment, the initial set of one or more predictors can be modified to add features, reduce features, or replace features of a predictor in the one or more set of predictors. The search engine can further instruct a client device to add a predictor to the initial set of predictors and instruct the client device to learn upon the predictor. The search engine can further instruct the client to replace a local predictor with a different predictor sent to the client device by the search engine. The search engine can also instruct the client device to modify an existing predictor to train on a new feature for the predictor. In an embodiment, the search engine can instruct the client to report back to the search engine whether the added, replaced, or modified predictor is generating search results that the user interacts with. If too little data is available for a predictor with multiple features, a machine learning algorithm may over-fit the predictor to the data available producing a "noisy" (less accurate) fit of the predictor to the data. In an embodiment, the client device can detect that there is insufficient data present on the client device for a given predictor, such as when the client device is new to the user. In such case, the client device can reduce the number of features in the predictor so that the predictor does not attempt to over-fit the data available to the predictor. The number of features in a local predictor can be reduced, such as by feature reduction, or a local predictor can be replaced by a predictor received from a remote search engine having fewer, or different, features than the local predictor it replaces.

A client device can generate a substantial amount of information that is private to a user. In an embodiment, the private information can be used to generate one or more local predictors that can be used to determine preferences of a user of the client device. The private information can also be used to add one or more features to an existing local predictor. In an embodiment, at least some of the private information of the user of the client device can be anonymized and shared with a remote search engine. For example, the client device can generate a predictor that learns that this particular user frequently selects movies from query results when the user is at home on a weekend evening in the winter. The particular user's exact selection of which movies she watches, and the particular user's home address are private information and would not be sent to a remote search engine. However, the fact that the user is at home now (determined through one or more location sensors) and that the user enjoys a particular genre of movies, such as romantic comedies, may be sufficiently anonymized such that the genre and "at home" status can be sent to a remote search engine to improve search results. For example, the client device can detect RF signals from the user's WiFi base stations at the user's home, and the detection of those signals can be used to determine that the user is at home, but the user's home address is not provided to the remote search engine. The anonymized private information preserves the privacy of the user of the client device while improving the relevance to the user of search results returned to the user in response to a query to the remote search engine.

In another embodiment, a search engine can generate a predictor based upon distinctions learned from crowd-sourced data generated by many users interacting with the search engine. A search engine can also generate a predictor based upon distinctions learned from another search domain that provides result to the search engine. For example, if Wikipedia adds a star rating system to articles stored and indexed by the Wikipedia domain, a search engine receiving search results from the Wikipedia domain can generate a predictor to train on whether users of the search domain interact with articles having a higher star rating. In an embodiment, results returned from the search engine to a client device can be tagged with the star rating of the Wikipedia search domain. In an embodiment, a search engine engineer can generate a predictor for use by the search engine, and/or for instructing a client to train upon. A search engine engineer can also modify an existing search engine predictor. In one embodiment, the search engine engineer can generate a first predictor and a second predictor. The search engine can then instruct a first plurality of client devices to train upon the first predictor and a second plurality of client devices to train on the second predictor. The search engine can further instruct the first and second plurality of client devices to report their respective learning progress on the first and second predictors back to the search engine. Specifically, the search engine can evaluate whether the first predictor or the second predictor generated search results that more users found relevant because more users interacted with the results from that predictor.

In another embodiment, a user of a client device can being a session with a remote search engine. The remote search engine can generate a unique ID for the user for the session. During the time that the session is active, the client device can generate, and store on the client device, a session context (or "intent" of the user) which characterizes the interaction between the user and the search engine during the time the session is active. The session can automatically expire in a predetermined period of time, such as 15 minutes. Alternatively, a user may choose to terminate, or temporarily suspend, a session. When the session expires or is terminated or suspended, the session ID for the session is no longer valid. After expiration, suspension, or termination of a previous session between the client device and the remote search engine, the search engine can automatically generate a new session ID for a new session between the client device and the search engine. The search engine can automatically generate the new session ID and in response to the client device sending a query or otherwise initiating a session with the search engine. The client device can receive the new session ID and, in response to receiving the new session ID, the client device can transmit the session context of the previous, now-expired session, to the search engine along with the new session ID so that the search engine can associate the session context with the new session ID. For example, a user may have been searching for cafes open between 12:00 pm and 2:00 pm in Sunnyvale, Calif., near Murphy's Station, with a Yelp® price rating of "$$" and a service rating of 4 stars or more. When the new session is initiated and the search engine receives the context of the previous session, the search context for subsequent searches will be, "Cafes open between 12:00 pm and 2:00 pm in Sunnyvale, Calif., near Murphy's Station, with a Yelp® price rating of "$$" and a service rating of 4 stars or more." In an embodiment, the information in the session context is anonymized before sending the session context to the search engine.

In yet another embodiment, a user can have a plurality of client devices associated with one another. An account of the user can provide the association between the devices by registering each of the user's client devices with the account. In an embodiment, each client device can synchronize the local predictors on that client device with local predictors on other of the user's client devices. The synchronization of predictors on client devices can be facilitated by a synchronization service. In addition, in an embodiment, a context of one or more previous search sessions can be synchronized across multiple client devices. For example, a user may been searching for an auto parts store in Hayward, Calif. using his home computer. After synchronization of the search context, the user can resume searching on his cell phone for an auto parts store.

In the description that follows, the term "local results" (or local query results) refers to results returned from a local database on a client device in response to a query. A "local database" refers to a database of information that is generally considered private to the user of a client device. The local database may reside physically on a client device that is used by, owned by, or registered to, a particular user. The local database can also reside on a network or cloud storage that is accessible to the user of the client device via an account that is owned by, or registered to, a user of the client device. Information that is "private" to a user is information that reasonable members of the public would deem personal and would not want to be shared with, for example, a remote search engine. An anonymized version of some private information may be shared with a remote search engine. For example, the exact address of the home of a user may be private and will not be sent to a remote search engine. But the fact that a user is not currently issuing a query from his home may be sufficiently anonymous to be sent to a search engine.

The term "search engine results" (or remote query results) refers to results returned from a search engine that is generally accessible to the public, with or without a logon or other authentication to use the search engine. A search engine may include, for example, Ask®, Yahoo®, Google® Search, AolSearch®, Bing®, or a plurality of such search engines. Search engine results can include results returned to a search engine by search domains, such as Wikipedia, Yelp®, a maps domain, a media domain, Twitter®, etc. Although a client device may send some information to a search engine, the information is typically sent in an anonymized form such that a particular person is not identified by information sent to the search engine. Further, private information is generally not sent to the search engine unless the information is sufficiently anonymized to preserve the privacy of the user of the client device.

The unqualified term "results" (or search results) will be used sparingly and refers to either local search results, or search engine results, or both. The unqualified term "results" (or search results) is to be read in the context in which it is used, and not in isolation.

The term "crowd-source data" refers to data generated as a consequence of a plurality of users issuing queries to a remote search engine and the feedback received from clients indicating a user's interaction with the search engine results to a user's query. Crowd source data includes queries issued to a remote search engine, and includes interaction data (feedback data) with search engine results, including engagement with a particular result, dwell time, click-through, rendering of the page, and abandonment of the result.

The term "predictor" refers to a machine learning model that correlates a query, and one or more features, with the user feedback regarding interaction with results returned from the query. There can be a predictor for each category of results, e.g. local email results, local text results, local contact results, remote results from Yelp®, remote results from Wikipedia®, remote results for media, remote results for maps, etc.

A predictor, or machine learning model, can be represented in a data structure having values. The data structure can be passed from a client device to a search engine, or received by a client device from a search engine. An example follows:

```
{
    "model_algorithm" : "naive_bayes",
    "model_type" : "main_tophit_model",
    "model_features" : [
    {
        "feature_name"   : "query_most_recently_selected",
        "feature_type"   : "boolean",
    },
    {
        "feature_name"   : "query_previously_selected",
        "feature_type"   : "boolean",
    },
    {
        "feature_name"   : "previously_selected",
        "feature_type"   : "boolean",
    },
    {
        "feature_name"   : "name_matches",
        "feature_type"   : "boolean"
    },
    {
        "feature_name"   : "match_quality",
        "feature_type"   : "real"
    },
    {
        "feature_name"   : "domain",
        "feature_type"   : "keypath"
    },
    {
        "feature_type"   : "boolean",
```

-continued

```
        "feature_name"   : "domain_tophit_candidate",
        "model_selector" : "domain"
    }
```

On a client device, user feedback will generally be a single user of the client device. On a search engine, user feedback will generally be crowd-source data. User feedback refers to how a user interacts with one or more results from query results. User feedback includes whether a result was rendered to a user, whether the user engaged with the result, such as by clicking on the result, whether the user "hovered" over the result (also referred to as "dwell time") such as by holding a mouse icon over a result, as if considering whether to engage with the result, whether the user abandoned the result, or whether the user did not interact with the result. Each of these user feedback elements can be measured in time from a reference point, such as the time at which the query results were presented to the user. By measuring user feedback in time, it can further be determined the order in which each of the query results was interacted with, if at all.

A "feature" (also known as a sensor, in machine learning) of a predictor refers to an input to the predictor that will be used to train the predictor to predict the results that a user will likely interact with. A feature can be a physical sensor, such as a light sensor, motion detector, vibration detector, horizontal/vertical switch or orientation sensor, sound detector (e.g. microphone), signal strength of network connection, such as WiFi or cellular network, or a location sensor, such as an RF receiver for triangulation of cell towers or GPS receiver that provides GPS coordinates. A feature can be obtained from a combination of physical sensors, such as a GPS receiver and an accelerometer and an orientation sensor can in combination detect whether the user is walking, running, driving, or stationary. A feature can also be obtained from information sources available to a client device, such as the current date, time, time zone, weather, or temperature. A feature can be further be a state, or combination of states of a client device, such as which applications are open, how long the applications have been open, whether a user has issued a query that relates to an application that is open, such as a user query regarding music when iTunes® is open, calendar events in the user's calendar, or whether a user is on a call, writing a text, or answering an email. Features can also be obtained from tags in results. For example, Yelp® may tag restaurant results with a price rating with a certain number of "$" signs or tag results with a service quality rating measured in a certain number of stars. The "$" tag may be in the form of an integer value, rather than a text tag. For example, Yelp® may return results tagged with a field: integer: yelp_dollars=3. Netflix® may tag results with an MPAA® rating, such as G, PG-13 or R, a price, a duration of a movie, or a genre of a movie. These tags can be used as features for a predictor. For example, Bob frequently selects PG-13 action movies priced under $9.99 that are less than two hours long, on weekend evenings. A feature may also be in the form of a key path. For example, a Netflix® result may have a tag: key path: genre="movie.horror.japanese," wherein each field of the key path can be a sub-genre of the result. A feature can further be identified in a boolean field, such as "boolean: Top-Hit=TRUE." A feature can alternatively be expressed as a real value, e.g. "real: Average_Stars=3.5". In an embodiment, a predictor treats each of these possible features as an individual feature (input) to the predictor. In some embodiments, a client device may maintain an aggregate, current state of a combination of features that a plurality of predictors can use as a single feature. For example, a user's location, the current day of the week, the current time of day, and a list of applications open on a device are features that may frequently appear together in predictors. A client device can maintain these features in a current state, as an aggregate feature (input) to any predictor that uses these features. A feature can additional be a distinction learned from analyzing results data. For example, whether "football" refers to American football or soccer is a feature than a predictor can train upon to determine whether this particular user interacts with soccer results of American football results. A remote search engine 150 can request that one or more features be calculated by the client device 100 at the beginning of a search session.

A feature can be learned either on local results or on remote search results. When a predictor is generated to learn on a new feature, the feature can be tagged with "local" or "remote" based upon whether the feature was learned on local results or remote search results. "Learning a new feature" refers to generating a new predictor, or extending or modifying an existing predictor, to train on that new feature. For example, an existing predictor may have trained on restaurant selections at lunch time during week days near the current location of a client device. A new feature may be that results returned from Yelp® now include a tag indicating a price range for menu items in restaurant results. The existing predictor can be extended to train on the price range tag as a new feature in the predictor having the features lunch time, week day, and near the user of the client device.

Feature metadata can be represented in data structures passed from a search engine to client device, or from a client device a search engine. Features can utilize this format with values in the fields. For example, a feature set can be represented as follows:

```
feature_metadata : [
    {
        "feature_name"   : "popularity",
        "feature_type"   : "real",
        "normalized" : 1,
        "feature_value" : 0.9
    },
    {
        "feature_name"   : "high_traffic",
        "feature_type"   : "boolean",
        "feature_value" : 1
    },
    {
        "feature_name"   : "site_domain",
        "feature_type"   : "string",
        "feature_value" : "apple.com"
    },
    {
        "feature_name"   : "site_type",
        "feature_type"   : "keypath",
        "feature_value"
        :"company.consumer_electronics.frontpage"
    },
    {
        "feature_name"   : "site_language",
        "feature_type"   : "keypath",
        "feature_value" : "en.us"
    },
]
```

A "search session" is a time-limited session of interaction between a client device 100 and search engine 150. Search engine 150 collects a great deal of information about a user of a client device 100 through the queries and selections (user interaction data) that a user makes during a search session. Even though search engine 150 should not know, with any specificity, the exact identity of a particular user, an unlimited accumulation of user interaction data may identify a user with a high degree of specificity. To preserve privacy when interacting with a search engine, search engine 150 limits collection of data to a time-limed session. The session has a unique session identifier (session ID). The timer may be set for, e.g., 15 minutes. At expiration of the session timer, the user is issued a new session ID. Although the search engine 150 may retain and analyze the 15 minute block of information, the search engine 150 should not associated the new session ID with the old session ID, else there would still be an accumulation of user interaction data and the session limits would have no privacy protecting effect.

In an embodiment, a predictor on a client device can learn a feature using statistical analysis method of one of: linear regression, Bayes classification, or Naive Bayes classification. "Machine learning" can include supervised learning, unsupervised learning, and reinforcement learning.

Some embodiments described herein include one or more application programming interfaces (APIs) in an environment with calling program code interacting with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code.

At least certain embodiments include an environment with a calling software component interacting with a called software component through an API. A method for operating through an API in this environment includes transferring one or more function calls, messages, other types of invocations or parameters via the API.

Other features and advantages will be apparent from the accompanying drawings and from the detailed description.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following detailed description of embodiments, reference is made to the accompanying drawings in which like references indicate similar elements, and in which is shown by way of illustration manners in which specific embodiments may be practiced. These embodiments are described in sufficient detail to enable those skilled in the art to practice the invention, and it is to be understood that other embodiments may be utilized and that logical, mechanical, electrical, functional and other changes may be made without departing from the scope of the present disclosure. The following detailed description is, therefore, not to be taken in a limiting sense, and the scope of the present invention is defined only by the appended claims.

Embodiments are described for using locally available information on a client device, and information obtained from a remote search engine, to learn features that improve both local and remote search results for a user of the client device, without disclosing private information about the user to a remote search engine.

Figure 1:
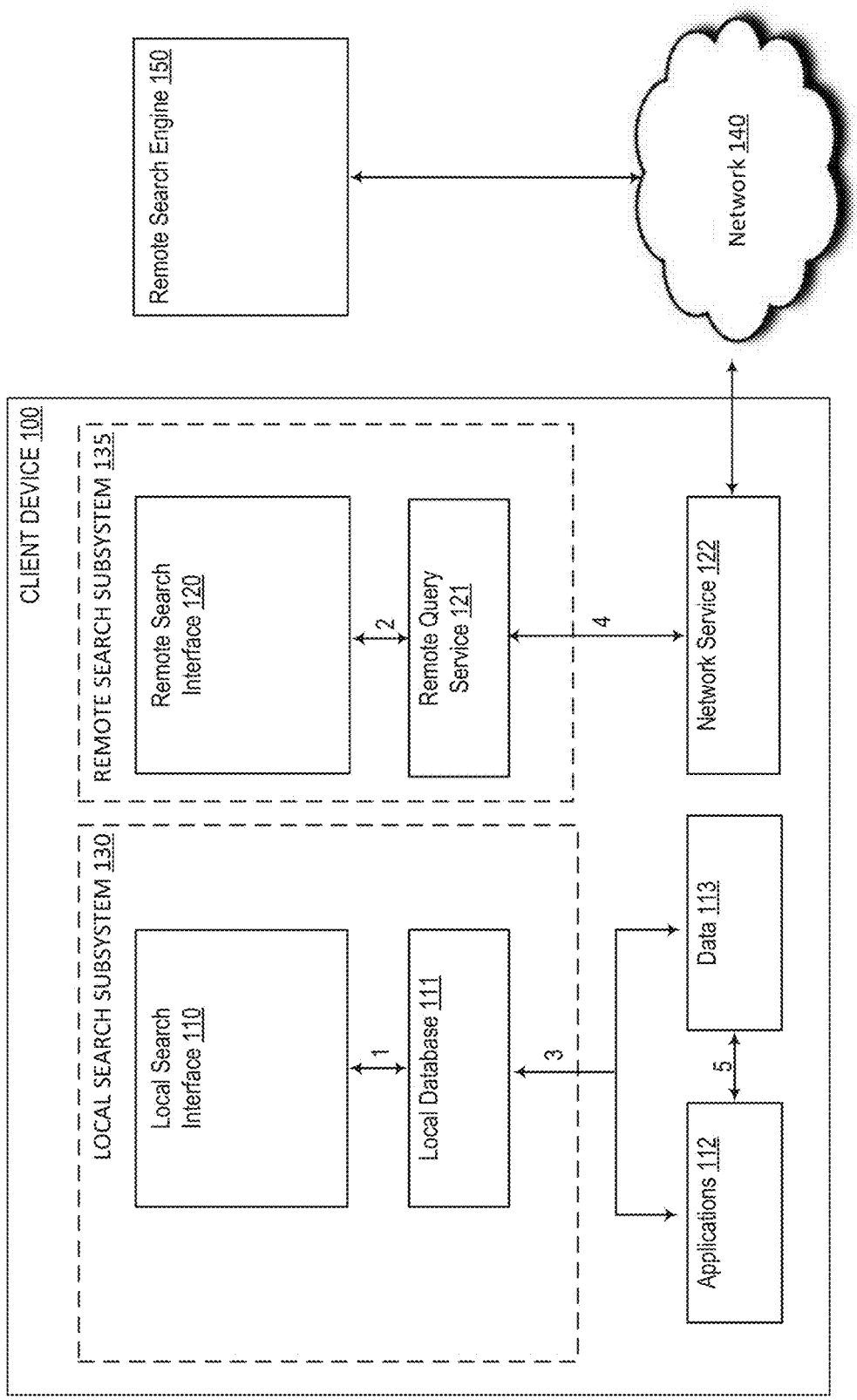
FIG. 1 illustrates, in block diagram form, a local search subsystem and a remote search subsystem on a computing device as is known in the prior art.

FIG. 1 illustrates a block diagram of a local search subsystem 130 and a remote search subsystem 135 on a client computing device 100, as is known in the prior art. The local search subsystem 130 can include a local search interface 110 in communication 1 with a local database 111 of searchable information.

Local database 111 indexes local information on the computing device 100 for searching using local search interface 110. Local information is private to a computing device 100 and is not shared with remote search subsystem 135. Local information can include data, metadata, and other information about applications 112 and data 113 on client device 100.

Local database 111, applications 112 and data 113 are not accessible by remote search subsystem 135. Queries entered into local search interface 110, local results returned from the local query, and a user's interaction with the local results returned from the local query are not shared with, or accessible by, remote search subsystem 135.

Local search interface 110 can communicate with local database 111 via communication interface 1. Local database can communication with applications 112 and data 113 via communication interface 3.

Remote search subsystem 135 can include remote search interface 120 and remote query service 121. Remote query service 121 can send a query to, and return results from, remote search engine 150 via network service 122 and network 140. The remote results are not made available to local search subsystem 130.

Remote search interface 120 can communicate with the remote query service 121 via interface 2. Remote query service 121 can communicate with the network service 122 via interface 4.

Figure 2:
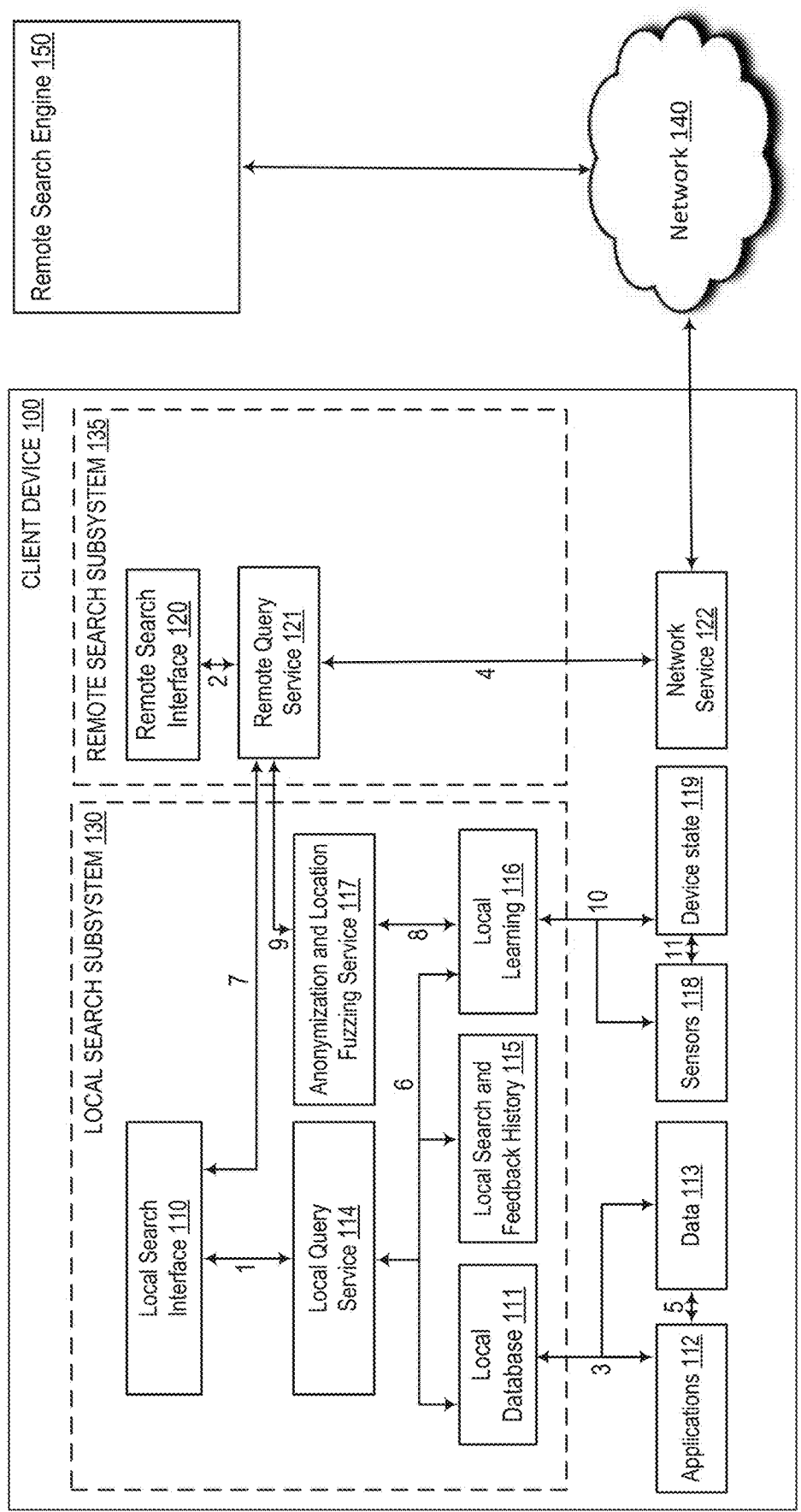
FIG. 2 illustrates, in block diagram form, a local search subsystem having local learning capability that can be used to improve the results returned from a remote search application on a computing device.

FIG. 2 illustrates, in block diagram form, a local search subsystem 130 having local learning system 116 that can be used to improve the search results returned from both local searches and searches of remote search engine 150, without exposing private information. In an embodiment, private information is anonymized by anonymization and location fuzzing service 117 before sending private information to remote search engine 150 via remote query service 121. In one embodiment, local learning system 116 can be reset so that learning is flushed.

Local search subsystem 130 can include local search interface 110 and local database 111 of data and metadata about applications 112 and data 113 on computing device 100. Local database 111 can include local information about data sources such as a contacts database stored on the client, titles of documents or words in documents stored on the computing device, titles of applications and data and metadata associated with applications on the computing device, such as emails, instant messages, spreadsheets, presentations, databases, music files, pictures, movies, and other data that is local to a computing device. In an embodiment, local database 111 can including information about data sources stored in a user's Cloud storage. Applications 112 can include a calculator program, a dictionary, a messaging program, an email application, a calendar, a phone, a camera, a word processor, a spreadsheet application, a presentation application, a contacts management application, a map application, a music, video, or media player, local and remote search applications, and other software applications.

A query can be generated using local search interface 110 and query results can be returned from local database 111, via communication interface 1, and displayed in local search interface 110. Local search subsystem 130 additionally can have a local query service 114, a local search and feedback history 115, and local learning system 116. Local query service 114 can receive a query from local search interface 110. In one embodiment, local search interface 110 can also pass the query to remote query server 121, via communication interface 7, so that local search interface 110 receives search results from both the local database 111 and from remote search engine 150. Local query service 114 can remove redundant white space, remove high frequency-low relevance query terms, such as "the" and "a", and package the query into a form that is usable by the local database 111. Remote query service 121 can perform analogous functionality for the remote search engine 150. In an embodiment, local search interface 110 can pass the query to the remote query service 121, via communication interface 7, to obtain query results from remote search engine 150. In one embodiment, remote query service 121 can receive a query feature learned by local learning system 116 via communication interface 8. The feature can be used to extend the query and/or bias a query feature to the remote search engine 150. In an embodiment, remote query service 121 can pass a query feature, returned from the remote search engine 150, to the local learning system 116 for training on that feature via communication interface 8.

Local search and feedback history 115 can store the history of all search queries issued using the local query interface 110, including queries that are sent to the remote query service 121 via communication interface 7. Local search and feedback history 115 can also store user feedback associated with both local and remote results returned from a query. Feedback can include an indication of whether a user engaged with a result, e.g. by clicking-through on the result, how much time the user spent viewing the result, whether the result was the first result that the user interacted with, or other ordinal value, whether result was the only result that a user interacted with, and whether the user did not interact with a result, i.e. abandoned the result. The user feedback can be encoded and stored in association with the query that generated the results for which the feedback was obtained. In one embodiment, the local search and feedback history 115 can store a reference to one or more of the results returned by the query. Information stored in the local search and feedback history 115 is deemed private user information and is not available to, or accessible by, the remote search subsystem 135. In one embodiment, the local search and feedback history 115 can be flushed. In an embodiment, local search and feedback history 115 can be aged-out. The age-out timing can be analyzed so that stable long term trends are kept longer than search and feedback history showing no stable trend.

Local learning system 116 can analyze the local search and feedback history 115 to identify features upon which the local learning system 116 can train. Once a feature is identified, local learning system 116 can generate a local predictor to train upon the feature. In an embodiment, a computing device 100 may be have an initial set of one or more local predictors installed on computing device 100 before a user begins using the device for the first time. In another embodiment, the local learning system 116 can modify a predictor by adding a feature to the predictor, deleting a feature from the predictor using feature reduction, or replace a predictor with a predictor received from a remote search engine 150.

In one embodiment, a predictor is an instance of a software component that operates on one or more pieces of data. In one embodiment, the local predictors can train using a statistical classification method, such as regression, Bayes, or Naive Bayes. In an embodiment, a predictor can be specific to a particular category of results. Categories can include: contacts, emails, calculator results, media results, maps results, Yelp® results, Wiki results, site search results, etc.

An anonymization and location fuzzing service 117 ("anonymization service") ensures that private information of the user that is stored in local database 111, local search and feedback history 115 and local learning 116 is kept private and is not sent to a remote search engine 150 without first anonymizing the data to be sent to the remote search engine 150. For example, anonymization and location fuzzing service 117 may substitute "at home" as a status of the user, instead of sending the user's home address, nearby cell tower identifiers, cell network IP address, WiFi IP address, or other information that could identify the user's location with a high degree of specificity. Similarly, anonymization service 117 may substitute "romantic comedy" as a genre that the user prefers in place of exact information identifies a particular movie that the user has previously selected for viewing, such as "Something About Mary."

Anonymization service 117 can further include a location "fuzzing" service. The location fuzzing service ensures that the exact location of a user is kept private. The location fuzzing service can take into account the population density of the current location of the user and obfuscate (or "fuzz") the user's location sufficiently to ensure privacy. For example, a user may currently be located in a highly dense city, looking for Italian restaurants having a price rating on Yelp® of "$$$$" and a dinner service rating of 4.5 stars on Columbus Ave. in San Francisco Calif. Since the current location of the user is fairly dense, the anonymizer service 117 may substitute a "fuzzed" location of the user, accurate within few blocks, in place of the user's exact GPS coordinates (accurate within a few feet) to a remote search engine 150 to obtain search results that are within walking distance of the user. In contrast, if the user is currently located on a remote farm in Ireland, and may be the only user within the area, anonymizer service 117 may substitute a "fuzzed" location for the exact location of the user that is accurate within a few square miles.

The computing device 100 can also include a remote search subsystem 135 that includes a remote search interface 120 and a remote query service 121. A remote search interface 120 can include a web browser such as Apple® Safari®, Mozilla®, or Firefox®. A query service 121 can perform intermediary processing on a query prior to passing the query to network service 122 and on to remote search engine 150 via network 140. Network service 122 can receive results back from remote search engine 150 for display on remote query interface 120 or on local search interface 110. Remote query service 121 can be communicatively coupled to network service 122 via communication interface 4.

Network 140 can include the Internet, an 802.11 wired or wireless network, a cellular network, a local area network, or any combination of these.

Interfaces 1-8 can be implemented using inter-process communication, shared memory, sockets, or an Application Programming Interface (API). APIs are described in detail, below, with reference to FIG. 12.

Figure 3:
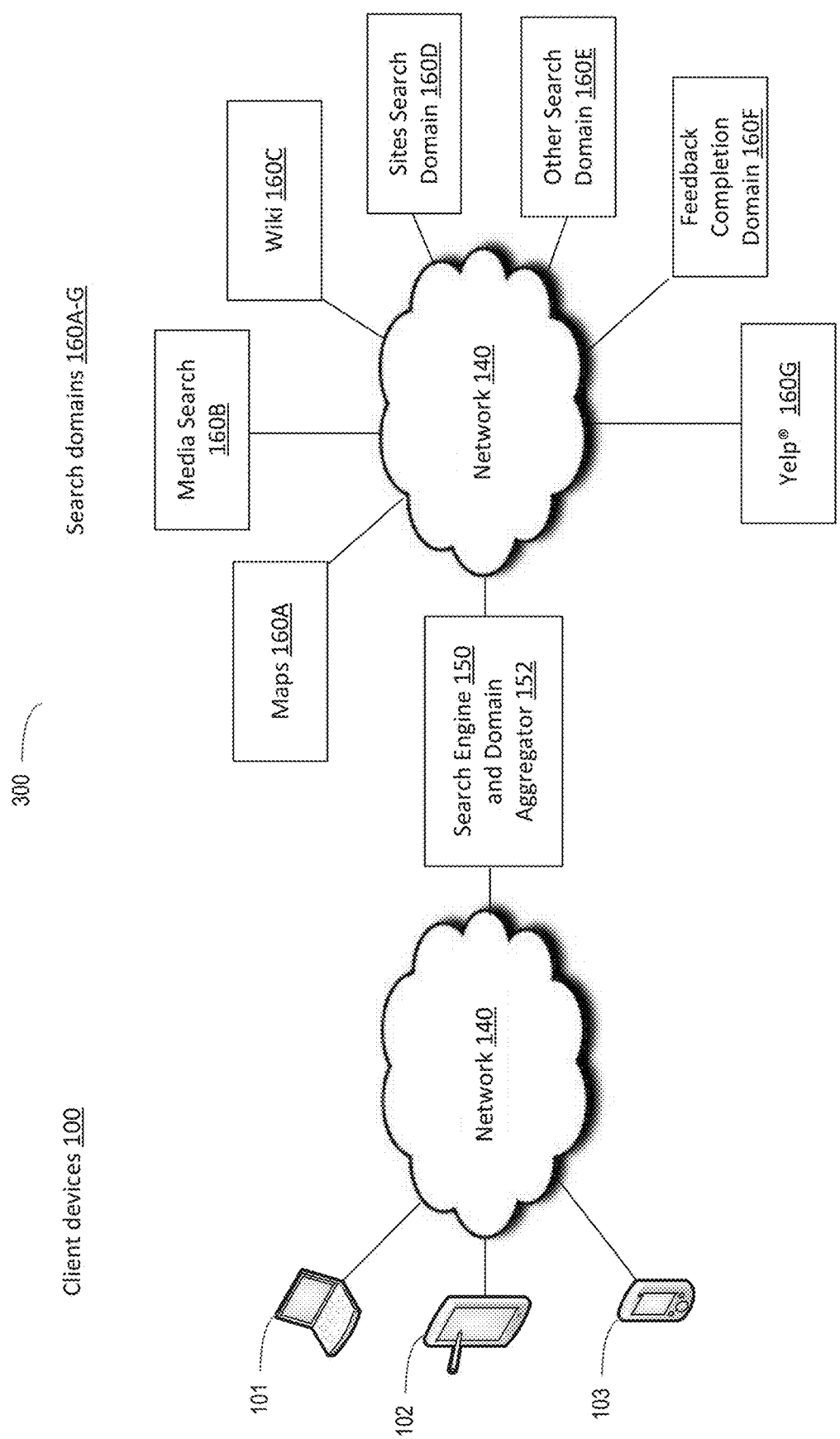
FIG. 3 illustrates, in block diagram form, a search engine that can aggregate search results returned from multiple domains in response to a query from a client device.

FIG. 3 illustrates, in block diagram form, a search system 300 in which a plurality of client devices 100 are coupled to search engine 150 and aggregator 152. Laptop computer 101, tablet computer 102, and cell phone 103 are representative of client devices 100. When a client device 100 initiates a query session with search engine 150, search engine 150 can generate a unique session identifier (session ID) for the client device 100 and can also start a session timer for the session. During the session, search engine 150 can store a history of the queries issued by the user, and can store an indication of which query results the user interacted with, and other user feedback data. The query results and feedback data can be stored by search engine 150 in association with the session ID. The stored queries and user interaction data represent a "user intent" or "query context" indicating what the user of the client device 100 has been querying about during the session. Since the stored queries and interaction data are private to the user of client device 100, the information can be retained on client device 100 even after the session timer has expired, thereby ending the session. When a session ends, and the user of the client device continues to interact with search engine 150 or query results returned during the session, search engine 150 can generate a new session ID and can transmit the new session ID to the user. To preserve privacy of the user, the new session ID and the expired session ID are not associated with one another within the search engine 150. In response to receiving the new session ID, client device 100 can transmit "user intent" or "query context" information to search engine 150 so that search engine 150 has a context for the user's continued interaction with the search engine 150. For example, a user may be searching for flights from the San Francisco Bay Area to Portland International Airport on a specific date. When the session expires, and a new session ID is generated and transmitted to client device 100, the user intent data can be transmitted to search engine 150 in conjunction with the new session ID so that search engine 150 can continue returning query results related to flights from the San Francisco Bay Area to Portland Oreg. on a specific date. In an embodiment, the user intent data can be anonymized before transmission to the search engine 150 by anonymization and location fuzzing service 117.

Search engine 150 can be coupled to a plurality of search domains 160A-G (collectively, search domains 160) via network 140. Search domains can be, for example, a maps domain 160A, a media search domain 160B, a Wiki domain 160C, a sites search domain 160D, an "other" search domain 160E, a feedback completion domain 160F, or a Yelp® domain 160G. Other domains can include a Twitter® domain, an iTunes® domain, a Netflix®, a LinkedIn® domain, or other search domain. Search engine 150 can receive a query from a client device 100. Search engine 150 can pass the search query across network 140 to search domains 160. Search domains 160 can return query results that match the query received by search engine 150. Search engine 150 can include an aggregator 152 that aggregates query results for transmission to the querying client device 100. Aggregating query results can include grouping query results by the search domain 160 that provided a subset of the query results. Aggregating query results can alternatively, or in addition, including filtering results based upon a predetermined threshold relevance value. A relevance value from a particular query result can be determined by the search domain 160 that provided the query result. In an embodiment, a relevance value can be determined by search engine 150 or aggregator 152.

Search engine 150 can determine that a particular query is a frequent, or common, query issued by users. In such case, search engine 150 can store the query and at least some of the search results in a cache on search engine 150. In an embodiment, search engine 150 can analyze the queries received from client devices 100, the query results returned to a user, and the user feedback collected. Search engine 150 can further determine a new feature from such analysis and can further generate a predictor for search engine 150 that trains on the query and the feature over the user feedback received from one or more client devices 100. In an embodiment, search engine 150 can instruct one or more client devices 100 to train upon a predictor. Search engine 150 can further instruct one or more client devices 100 to report their respective training progress on the predictor to search engine 150.

Search engine 150 includes aggregator 152 and multiple search domains 160A-G. In one embodiment, aggregator 152 receives requests for query completions based on at least a partial input query ("input query prefix"). In response to receiving the input query prefix, the aggregator 152 sends the input query prefix to each of the search domains 160A-G. Each of the search domains 160A-G uses the input query prefix to determine possible query completions in that domain. For example in one embodiment, the map search domain 160A receives an input query prefix and searches this domain for possible query completions. In one embodiment, the aggregator 152 receives the query completions from each of the search domains 160A-G, and ranks the received query completions based on the relevance scores for each of the completions determined by the corresponding search domain and weights based on the query prefix context.

In one embodiment, the maps search domain 160A is a search domain that includes information related to a geographical map. In this embodiment, the maps information can include information about places, addresses, places, businesses, places of interest, or other type of information relating to maps. In another embodiment, the maps information can also include information related to places of interest, such as opening hours, reviews and ratings, contact information, directions, and/or photographs related to the place. In one embodiment, the media search domain 160B is a search domain related to media. In one embodiment, the media search domain 160B includes information related to music, books, video, classes, spoken word, podcasts, radio, and/or other types of media. In a further embodiment, the media search domain 160B can include information related to applications that can run on the device, such as a computing device 101, tablet computer 102, or smartphone 103 as described above. In one embodiment, media search domain 160B is a media store that includes different types of media available for purchase (e.g., music, books, video, classes, spoken word, podcasts, radio, applications, and/or other types of media). In one embodiment, the wiki search domain 160C is an online encyclopedia search domain. For example and in one embodiment, wiki search domain 106C can be WIKIPEDIA. In one embodiment, the sites search domain 160D is a search domain of websites. For example and in one embodiment, the sites search domain 160D includes business, governmental, public, and/or private websites such as "apple.com," "whitehouse.gov," "yahoo.com," etc. In one embodiment, the other search domain 160E is a set of other search domains that can be accessed by the aggregator 152 (e.g., a news search domain). In one embodiment, the feedback completion domain 160F is a search index that is based on query feedback collected by browsers running on various devices. In one embodiment, the feedback completion domain 160F includes a feedback index that maps queries to results based on the collected query feedback. In one embodiment, Yelp® search domain 160G returns query results from Yelp® reviews generated by individual people commenting upon businesses which they have patronized. Yelp® query results can include tags for a price rating, e.g. "$$," and a service quality rating measured in stars, e.g. 1 to 5 stars indicating poor to excellent service.

As described above, each search domain 160A-G includes information that allows each of the search domains 160 to give a set of query completions based on an input query prefix. In one embodiment, each of the search domains includes a query completion tree that is used to determine the query completion as well as determine scores for each of those query completions. Based upon the query completions of each domain 160A-G, query results are returned to search engine 150 and domain aggregator 152 by each of the search domains 160A-G. A particular search domain in 160A-G may not return any results for a particular query. A search domain may not return any results if the particular search domain does not have any results matching the query, or if the relevance score of the results the particular search domain has are below a threshold value. The threshold value for returning results can be a part of a query received from a client device 100, or set by search engine 150, domain aggregator 152, or by the particular search domain 160.

Figure 4:
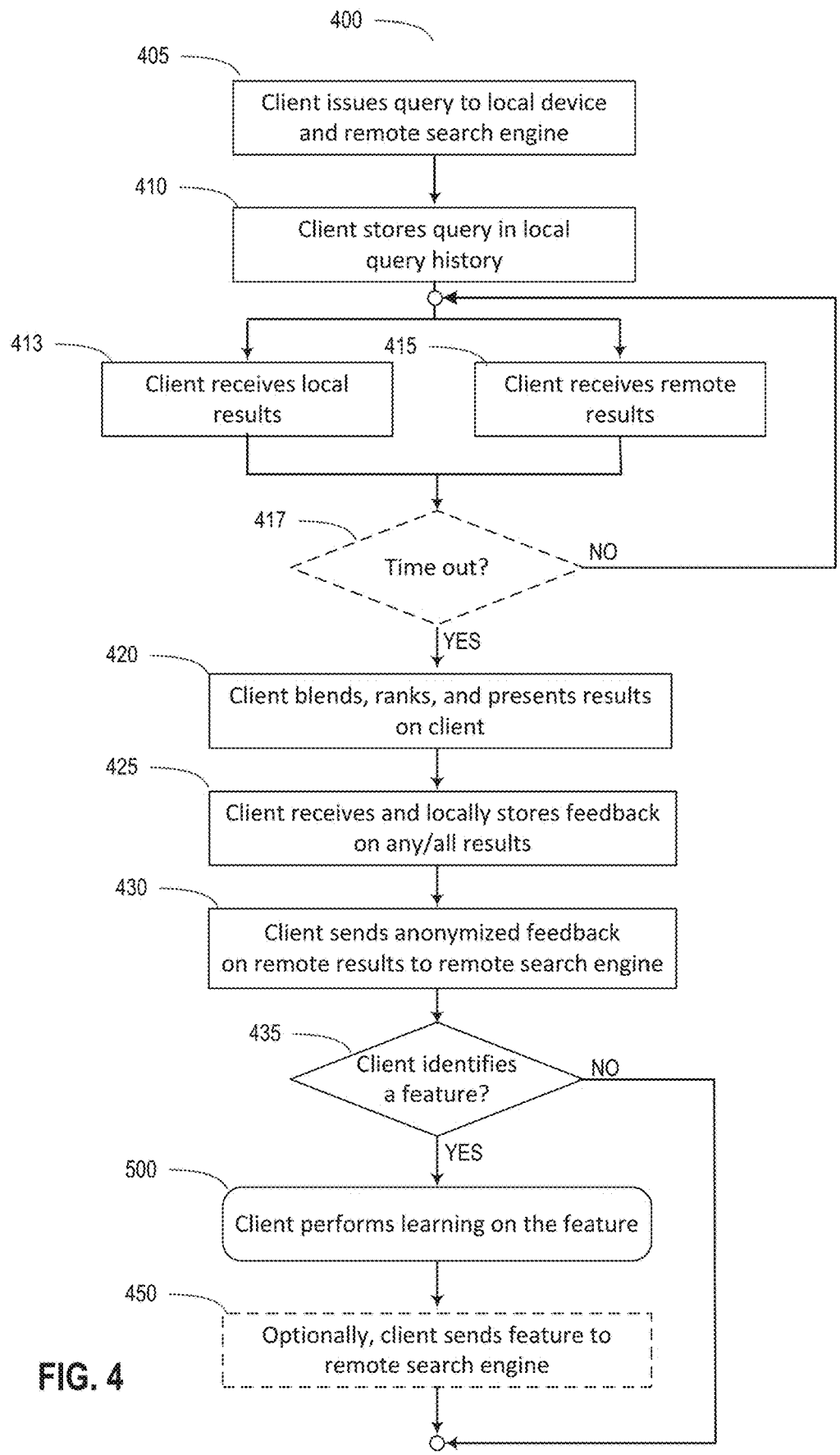
FIG. 4 illustrates, in block diagram form, a method of locally learning a query feature utilizing local search queries, local results and local feedback based on the local results.

FIG. 4 illustrates, in block diagram form, a method 400 of locally learning a query feature utilizing local user feedback on both local and/or remote search results returned from both local search queries and remote search queries.

In operation 405, a user issues a query using the local search interface 110. As described above, local search interface 110 can pass the query to one, or both, of local database 111 and remote search engine 150 via local query service 114 or remote query service 121, respectively.

In operation 410, client device 100 can store the query in the local search history and feedback history 115.

As shown in operations 413 and 415, local results from local database 111 and remote results from remote search engine 150, respectively, may return at the same time, or asynchronously. In one embodiment, a timer 417 can be set to determine when to display the results that have been received up to the expiration of the timer 417. If the timer 417 has not yet expired, the method can continues to receive local search results in operation 413 and receive remote search results in operation 415. In an embodiment, additional results can be received after the expiration of the timer 417. The time value can be configured locally on the computing device 100, or on the remote search engine 150, or on both such that local and remote search results are displayed at different times.

In operation 420, the local search results and the remote search results can be blended and ranked, then presented to the user on the local search interface 110. In one embodiment, if the local learning system 116 determines that, e.g. a calculator application result is highly relevant, then the calculator application result is ranked toward the top. A calculator result may be highly relevant if the user issued a query from within the calculator application and the query "looks" like a computation or a unit conversion. In an embodiment, local results 413 matching the query can be ranked higher than remote search engine results 415. In an embodiment, results can be ranked and/or filtered utilizing a previously learned feature. In an embodiment, local results 413 can be presented in categories, such as emails, contacts, iTunes®, movies, Tweets, text messages, documents, images, spreadsheets, et al. and ordered within each category. For example, local results 413 can be presented within categories, ordered by the most recently created, modified, accessed, or viewed local results 413 being displayed first in each category. In another embodiment, categories can be ordered by context. For example, if a user issues a local query from within his music player application 112, then results returned from the local database 111 that are related to the music player application 112 can be categorized and displayed before other local results 413. In yet another embodiment, categories can be ordered by the frequency that a user interacts with results from a category. For example, if a user rarely interacts with email results, then email results can be categorized and displayed lower than other local results 413. In an embodiment, the display order of local categories is fixed. This can facilitate easy identification for a user, since local result categories rarely change. In another embodiment, categories can be displayed according to a relevance ranking order, and the results within each category can be displayed by relevance ranking order.

In one embodiment, results 415 returned from remote search engine 150 can include a relevance score based on at least one of: whether the a query term is equal to the title of the result, whether a query term is within the title of the result, whether a query term is within the body of the result, or based on the term frequency-inverse document frequency of one or more query terms. Additionally, remote search engine search results 415 can have a query-dependent engagement scores indicating whether other users that have issued this query have engaged with the result, meaning that users found the result relevant to the query. A result may also have a query-independent engagement score indicating whether other users have engaged with the result, meaning that other users found the result relevant regardless of the query used to retrieve the result. A result may also have a "top-hit" score, indicating that so many users found the result to be relevant that the result should be ranked toward the top of a results set presented to the user. In one embodiment, local learning system 116 can generate, for each result, a probability that this user of this computing device 100 will likely also find the result relevant.

In operation 420, client device 100 blends, ranks, and presents both the local search results and remote search results on client device 100. In operation 425, the local search interface 110 can receive feedback from the user indicating whether a user has engaged with a result, and if so, how long has the user engaged with the result, or whether the user has abandoned the result. The user feedback can be collected and stored in the local search and feedback history 115, regardless of whether a result is a local database result or a remote search engine result. The query can also be stored in the local search and feedback history 115. In one embodiment, the query and the feedback history can be associated with a particular user of the computing device 100. In an embodiment, the query, feedback history 115, and association with a particular user, can be used by the local learning 116 to generate a social graph for the particular user.

For example, suppose that a particular user, Bob, issues one or more queries to the local search subsystem 130 and remote search subsystem 135 in operation 405 for "Bill" and "Steven." Local results 413 can be received from, e.g., a contacts application 112 and remote results 415 can be returned for, e.g., LinkedIn® profiles of persons named Bill and Steven, as well as other remote results 415. After the results are blended, ranked, and presented to the user Bob in operation 420, then in operation 425 the search query and feedback history 115 of Bob's interaction with the local results 413, the remote results 415, or both, can be stored in local search and feedback history 115. From this stored search history and feedback 115, a social graph can be generated by local learning system 116 from Bob's interaction with local results 413, remote results 415, or both.

In an embodiment, local learning on remote results can also be used to filter out results that the user has repeatedly been presented, but the user has not interacted with. For example, in operation 405, a user may issue a query to the local search subsystem 130 and remote search subsystem 135 for a current political topic. The remote results 415 returned in response to the query may include results from The Huffington Post® and Fox News®. In operation 425, local learning system 116 can learn from the locally stored feedback on any/all results that this user rarely, or never, interacts with Fox News® results. The local learning system 116 can determine a new feature to train upon, "News Source." The learning system 116 can learn to exclude, or lower the ranking of, Fox News® results from future remote results 415 when blending, ranking, and presenting results on the local device in operation 420.

In operation 430, feedback history of the remote search engine results can be returned to the remote search engine 150. The feedback history can be anonymized so that a particular user and/or machine is not identified in the information sent to the remote search engine 150. In one embodiment, the query associated with the anonymized feedback is not sent to the remote search engine, to preserve user privacy.

In operation 435, it is determined whether the client device 100 has identified a new feature to train upon. A new feature can be identified by the client device 100 receiving a new feature to train upon from the remote search engine 150. In an embodiment, receiving a new feature to train upon can further include instructions to the client to train upon the feature and, optionally, report the results of such training back to the remote search engine 150. A new feature can further be identified through the client device 100 analyzing the local search and feedback history 115 to determine whether a feature can be identified from the local and remote query results and the feedback on those results. Local learning system 116 can utilize the feedback on all of the results for the query, both local and remote, in determining whether a feature can be identified.

If a feature was identified in operation 435, then in operation 500, the client performs learning on the feature. Operation 500 is described below with reference to FIG. 5.

In operation 450, local learning system 116 can optionally send a feature vector to remote search engine 150 based upon a feature identified by local learning system 116. Using the news sources example again, in operation 405 a user may query the local search subsystem 130 and remote search subsystem 135 for a current political topic. Remote results 415 returned in response to the query may include results from The Huffington Post® and Fox News®. Remote search engine 150 may have returned results for Fox News® as the top rated results based upon interaction by many users of remote search engine 150. However, local feedback history 115 for this particular user may indicate that this particular user does not interact with Fox News® results, contrary to the top rated ranking of Fox News® results by remote search engine 150. In operation 435, local learning system 116 can identify as a feature that this user does not interact with Fox News® results, even though remote search engine 150 ranks the Fox News® results as top rated. Local learning system 116 can learn upon this feature in operation 440, and optionally send the feature back to the remote search engine 150 in operation 450.

Figure 5:
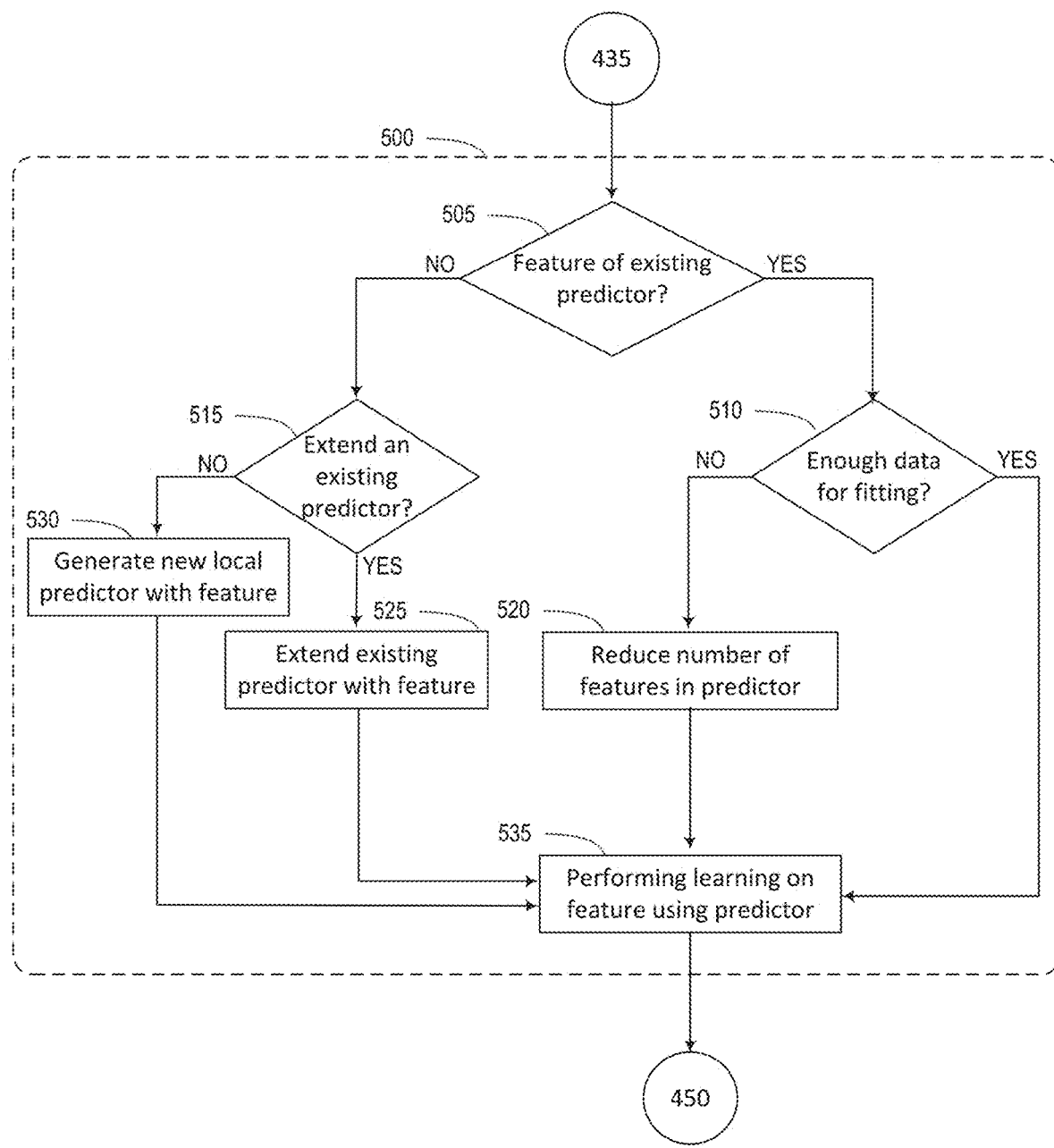
FIG. 5 illustrates, in block diagram form, a more detailed method of a client learning upon a feature.

FIG. 5 illustrates, in block diagram form, a more detailed view of a method 500 of a client device 100 leaning upon a feature. In operation 505, it is determined whether the feature identified in FIG. 4 operation 435 is a feature of an existing predictor.

If the identified feature is a feature of an existing predictor, then in operation 510 it can be determined whether there is enough data stored in the location search and feedback history 115 to fit the predictor to the data. For example, when a client device 100 is new to a user, there will be little or no local search and feedback history 115 data available with which to fit the predictor to the data. Fitting a predictor when there is insufficient data can cause over-fitting of the predictor to the available data, making a "noisy" (possibly less accurate) fit of the predictor to the data. If, in operation 510 it is determined that there is sufficient data to fit the existing predictor with the identified feature to the local search and feedback history data, then in operation 535, local learning system 116 performs local learning on the predictor with the identified feature.

If the identified feature is a feature of an existing predictor, but in operation 510 it is determined that there is not enough data to fit the predictor to the local search and feedback history data, then in operation 520 the number of features in the predictor can be reduced, i.e., a feature can be removed from the predictor. In an embodiment, the feature identified in FIG. 4 operation 435 can be the feature that can be removed from the predictor. In an embodiment, more than one feature can be removed from the predictor. In an embodiment, the determination of which feature, or features, to remove from a predictor can be predetermined in software on the client device 100. In an embodiment, if the predictor is a predictor that a search engine 150 instructed the client device 100 to train upon, the client device 100 can perform one or more of: not removing a feature from the predictor, informing the search engine that a feature is being removed from the predictor, or alternatively removing a feature that the search engine 150 has identified as a feature that can be removed from the predictor in the event that feature reduction is necessary. In an embodiment, there can be more than one such feature that search engine 150 identified as a feature that can be removed from a predictor in operation 520. After feature reduction in operation 520, then in operation 535, local learning system 116 performs local learning on the predictor with the identified feature.

If, in operation 505, it is determined that the feature identified in FIG. 4 operation 435 is not a feature of an existing predictor (i.e., it is a new feature), then in operation 515 it is determined whether the identified feature should be used to extend an existing predictor. If so, then in operation 525 an existing predictor can be modified to include the identified feature, then in operation 535, local learning system 116 can perform local learning on the modified predictor with the identified feature. If in operation 515 it is determined that the identified feature should not be used to extend an existing predictor, then in operation 530 a new predictor can be generated with the identified feature. Then, in operation 535, local learning system 116 can perform local learning on the new predictor with the identified feature. The method 500 ends by returning to operation FIG. 4 operation 450.

Figure 6:
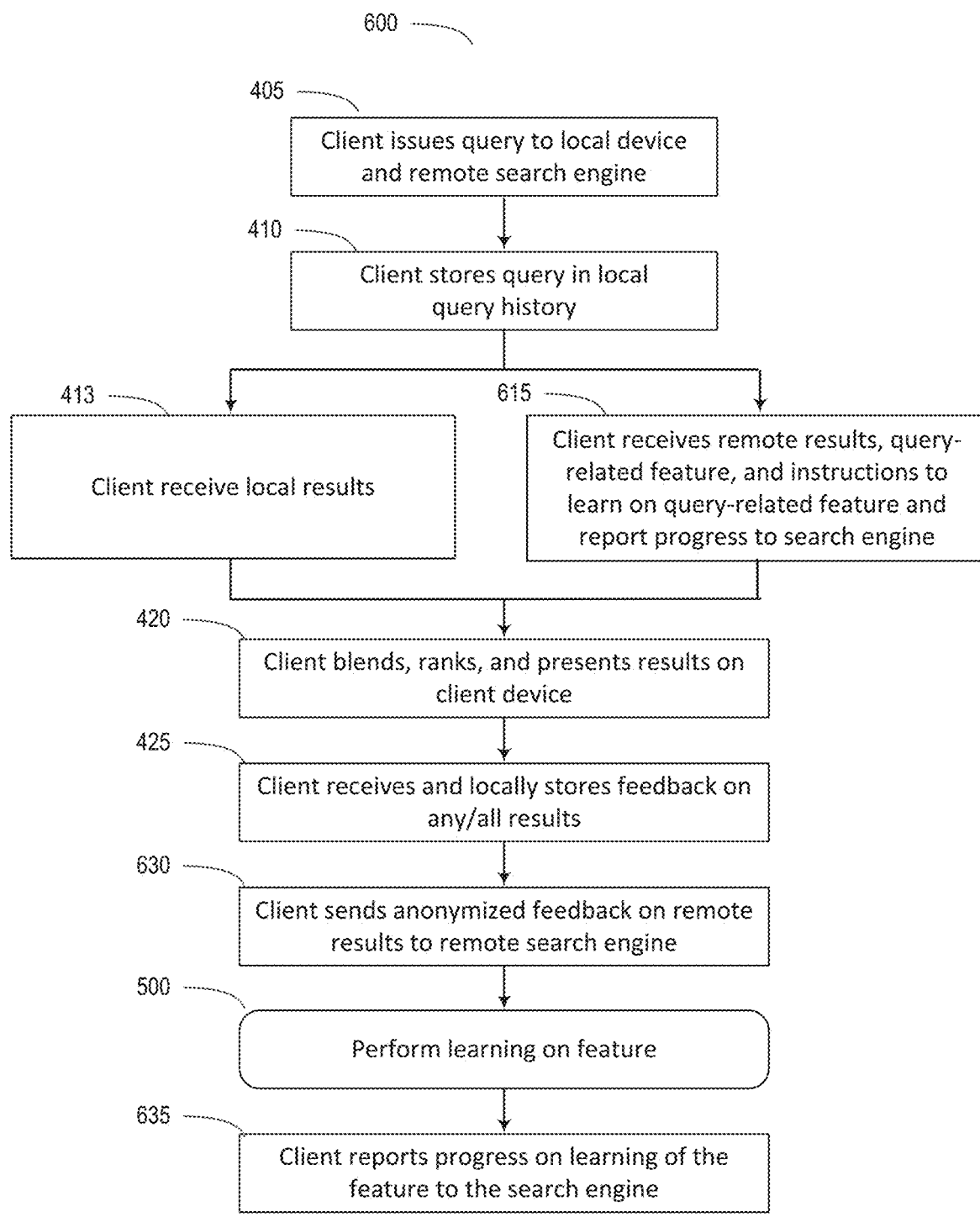
FIG. 6 illustrates, in block diagram form, a method of locally learning a query feature passed to a local device by a remote search engine in response to a query sent to the remote search engine.

FIG. 6 illustrates, in block diagram form, a method 600 of locally learning a query feature passed to a client device 100 by a remote search engine 150. In an embodiment, the feature is sent to client device 100 by remote search engine 150 in response to client device 100 sending a query to remote search engine 150.

Some of the operations in method 600 have already been described above with reference to FIG. 4 and FIG. 5, above. A brief description of these operations will be repeated here.

In operation 405, client device 100 issues a query to local search subsystem 130 and remote search subsystem 135. Remote search subsystem 135 forwards the query to remote search engine 150 via network 140. In operation 410, client device 100 stores the query in local search and feedback history 115. In operation 413, local search interface 110 on client device 100 receives local results from local database 111. In operation 615, client device 100 receives remote query results from remote search engine 150, a query-related feature, and instructions to train upon the query-related feature. The remote query results are passed to local search interface 110. In an embodiment, client device 100 further receives from search engine 150 instructions to report progress to search engine 150 of training upon the query-related feature.

In operation 420, client device 100 can blend, rank, and present both local and remote search results in the local search interface 110 of client device 100. In operation 425, client device 100 can receive and store in local search and feedback history 115, feedback on local search results, remote search results, or both.

In operation 630, client device 100 can send feedback on user interaction with remote search engine 150 query results. In an embodiment, anonymization and location fuzzing service 117 can be used to anonymize user interaction data with remote search engine query results, local database query results, or both, before transmitting user interaction data to remote search engine 150.

In operation 500, client device local learning system 116 can train upon the feature received from search engine 150. In operation 635, client device 100 can report progress on training on the feature to search engine 150. In an embodiment, client device 100 can report progress to search engine 150 in response to a request for an update on training progress for the feature from search engine 150. In another embodiment, client device 100 can report training progress to search engine 150 at a predetermined interval of time or predetermined event, such as a predetermined number of queries that are substantially similar to the query issued to local data base 111 and search engine 150 in operation 405, above. In an embodiment, progress on training can be measured by an increase in the number of query results that the user interacts with for a substantially identical query, after local learning system 116 has trained upon the feature sent to client device 100 by search engine 150 in operation 615. Progress can further be indicated by a better fit of the predictor having the feature to local search and feedback history 115, after training upon the feature by local learning system 116.

Figure 7:
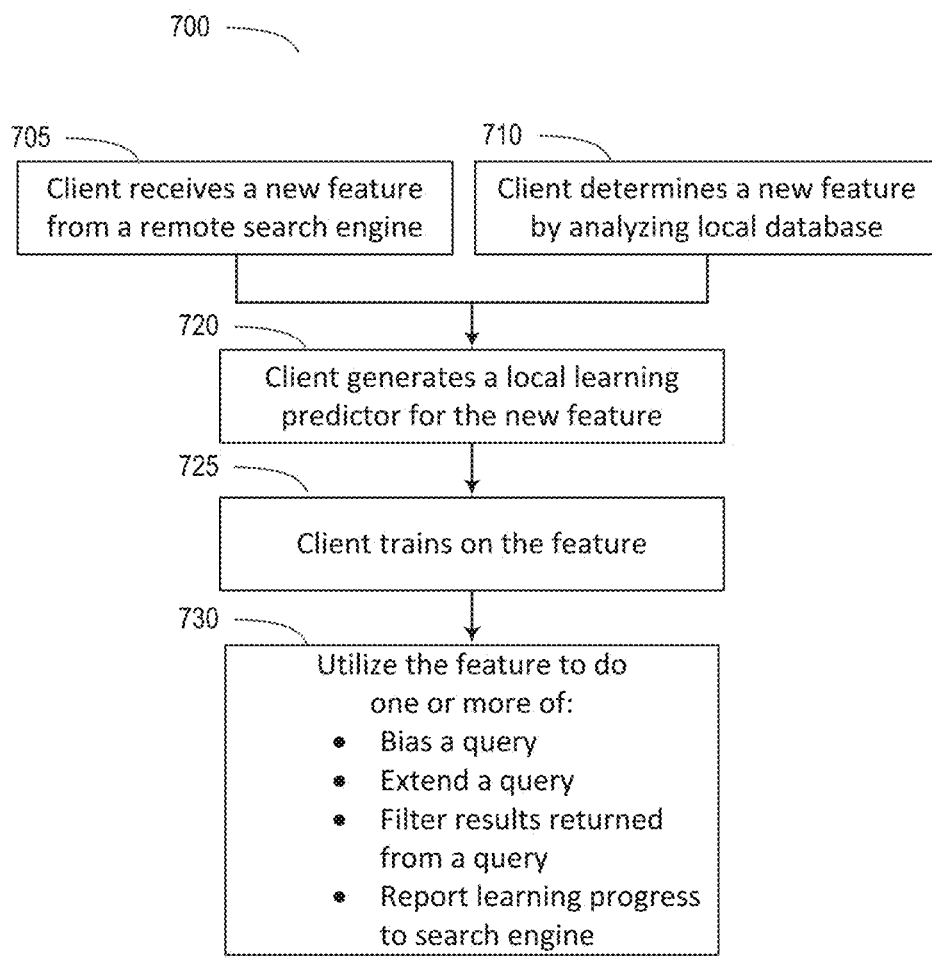
FIG. 7 illustrates, in block diagram form, a method of receiving or determining a new feature, locally training on the feature, and utilizing the feature.

FIG. 7 illustrates, in block diagram form, a method 700 of receiving or determining a new feature, locally training on the feature, and utilizing the feature to improve search results returned from subsequent queries.

In operation 705, remote search engine 150 can return to computing device 100 a new feature to train upon. The remote search engine 150 can return the feature to the computing device 100 in conjunction with results returned from a query to search engine 150 by computing device 100. In one embodiment, the feature can be returned to computing device 100 independent of whether the query was generated from the local search interface 110 or the remote search interface 120.

A client device 100 may receive a new feature to train upon from a search engine, for example, if a search engine 150 detects that an existing search domain 160, Yelp® has added a new tag to restaurant results returned to search engine 150 from search domain 160. The new tag may help improve search results for queries from client devices. For example, Yelp® may add a new tag to search results to indicate a price range for menu items at a restaurant. The tag can be, for example, a number of dollar signs from one to five. One dollar sign may indicate very inexpensive menu items, while five dollar signs can represent a fine dining restaurant with higher prices. Search server 150 can pass this feature to client devices 100 to train upon.

In operation 710, method 700 can alternatively begin by local learning system 116 determining a feature by analyzing the local search and feedback history 115. A few examples are given below:

A user may issue a query for "football scores." Remote search engine 150 may return results for both football scores and soccer scores. Remote search engine 150 may have determined that the computing device 100 that sent the query was located at an IP address that is in the United States. Therefore remote search engine 150 prioritized American football scores, such as the Dallas Cowboys, as being the most relevant results. In many European and South American countries, football means soccer. Suppose the user that issued the query is interested in, and interacts with, the soccer results. Local learning system 116 can analyze the local search history and feedback history 115 to determine that the user did not interact with the higher-ranked American football scores. Local learning system 116 can then analyze the results and determine that the feature that football has at least two meanings and that the user of this computing device 100 has a preference for soccer over American football.

Using the football scores example again, upon receiving the results for football scores, the user may have wondered why he was receiving American football scores. In the local results returned from local database 111, there may be a dictionary entry for the word, "football." The user clicked on the dictionary entry for "football." In response, the local learning system 116 can determine a new feature that there are alternate definitions for football and that this user has a preference for soccer over American football.

In another example, suppose that a user enters the query, "Montana," and receives a local result from his address book, "Mary Montana," a local result from his dictionary, remote results for Joe Montana (American football legend), and the U.S. State of Montana. The user clicks on Mary Montana from his local address book almost every time that he queries for Montana. Local learning system 116 can determine a feature for Montana, and that this user has a preference for the contact record "Mary Montana."

In yet another example, a user issues a query for, "MG." The user has many pictures of British MG cars on his local computer and they are indexed in the local database 111. Remote search engine 150 may return results for the element, "Magnesium" (symbol Mg). The user may also have many songs on his computer by the band, "Booker T. and the MGs" and receive local results accordingly. Local learning system 116 can determine the disparity in these results and can determine a feature for "MG."

Once a feature has been received in operation 705, or determined in operation 710, then in operation 720 the local learning system 116 can generate a local predictor for the feature. Local learning system 116 can alternatively add the feature to an existing predictor, or modify an existing predictor by replacing an existing feature of the existing predictor with the new feature. For example, client device 100 may detect or receive a new feature regarding restaurant results. A search domain 160, e.g. Yelp®, can tag results returned from the Yelp® with a feature of a dollar sign tag when the search domain receives a query for restaurants. Local learning system 116 can generate a predictor to train on the number of dollar signs on restaurant results that the user most often selects.

In another embodiment, local learning system 116 on a client device 100 may have a local predictor that trains on restaurants, on weekdays, between 11 a.m. and 2 p.m. Search engine 150 can learn from search domain 160 Yelp® that restaurant results have a new tag that indicates the approximate price range for menu items at a restaurant. In operation 710, search engine 150 can instruct client device 100 to extend the existing predictor to include the price range dollar sign feature. Local learning system 116 can add the feature to the existing predictor. When local learning system 116 trains upon the extended predictor, the extended predictor will attempt to determine the dollar rating of restaurants that the particular user of the client device 100 selects at lunch time on weekdays. Local learning system 116 may learn that the particular user selects restaurants having a price rating of "$$" for weekday lunches. In subsequent searches, local learning system 116 can rank restaurant query results higher if the price rating is "$$" because that is what this user selects most often for weekday lunches.

In operation 725, the local learning system 116 can use the local predictor to train on the feature, "MG," utilizing the local search history and feedback history 115. The local learning system 116 can also use the context of the computing device 100 to train upon a feature.

Using the MG example, above, if a user issued the query, MG, from inside a Calculator program, the local learning system 116 can utilize the context to learn that the user was most likely interested in the molecular weight of magnesium, or other property of magnesium, and train on MG accordingly. If the user issued the query from inside a picture viewing application, while viewing a picture of an MG car, the local learning system 116 can utilizing the context to learn that the user is most likely interested in British MG cars.

In operation 730, a feature learned by the local learning system 116, or a feature received from the remote search engine 150, can be utilized in several different ways including biasing a subsequent query, extending a subsequent query, filtering results returned from a query, and reporting learning press to search engine 150.

When issuing a new query for MG, e.g., the query can be extended utilizing a learned preference for MG (e.g. magnesium). In one embodiment, when issuing a new query for MG, e.g., the query can be biased in favor of results for magnesium. Local learning system 116 can compute a bias probability (learned preference) associated with each query feature and provide the bias to remote search engine 150 as a feature vector. In an embodiment, the feature vector can be sent to remote search engine 150 the next time that a user queries remote search engine 150 using a query term associated with the feature. In an embodiment, the feature can be used to filter the results returned from either, or both, the local database 111 or the remote search engine 150 to limit, the results returned to the query MG to, e.g., magnesium results.

Figure 8:
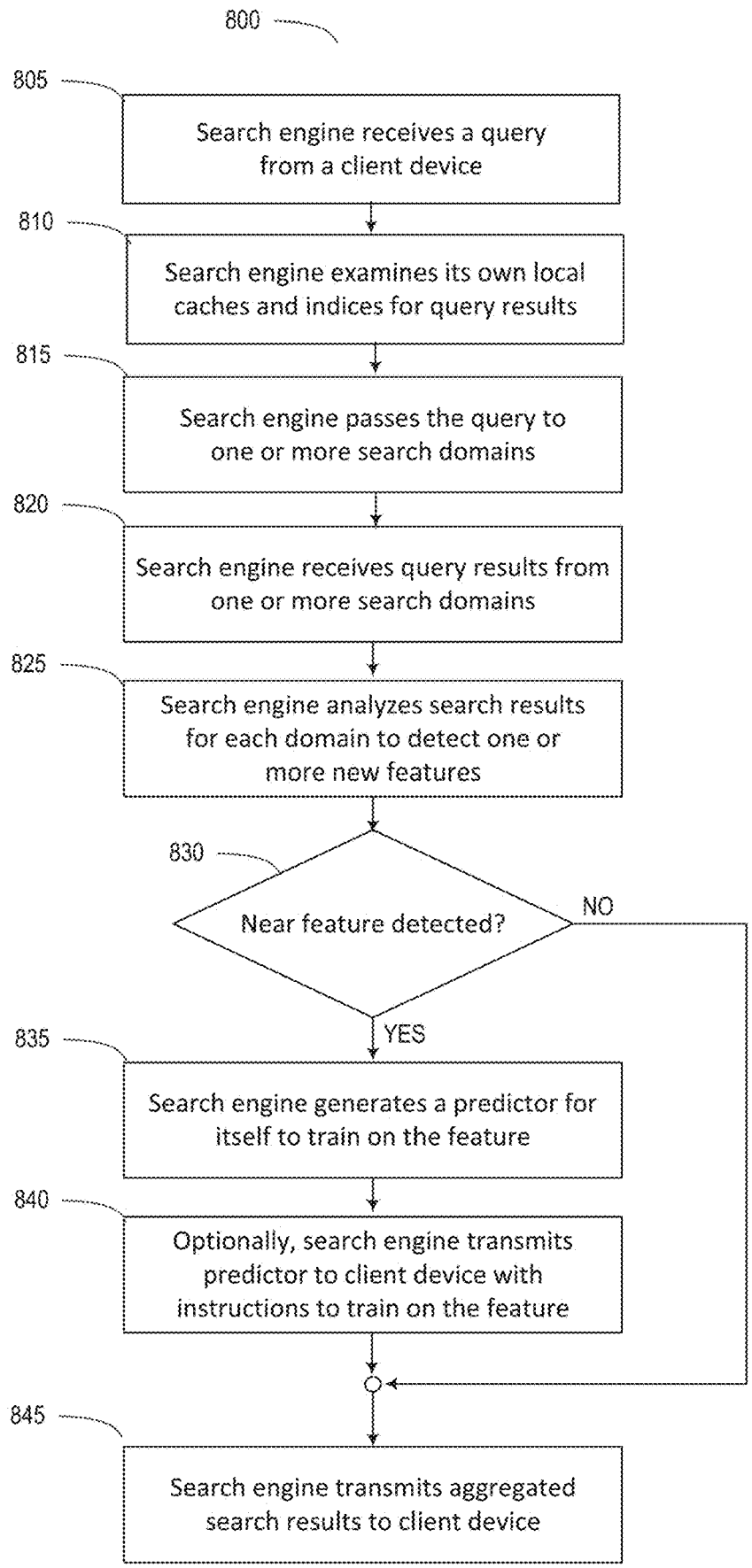
FIG. 8 illustrates, in block diagram form, a method of aggregating search results from multiple search domains and detecting and learning upon a new feature.

FIG. 8 illustrates, in block diagram form, a method 800 of aggregating search results from multiple search domains and determining and learning upon a new feature.

In operation 805, search engine 150 can receive a query from client device 100.

In operation 810, search engine 150 can examine its own local cache and indices to obtain query results before, or in conjunction with, passing the received query to one or more search domains 160 via network 140, in operation 815.

In operation 820, search engine 150 receives query results from one or more search domains 160. Search domains 160 may not all return their search domain query results at the same time. Thus, search engine 150 may receive search domain query results from the various search domains 160 asynchronously.

In operation 825, search engine 150 can analyze results returned from search domains 160 with crowd-source user feedback data for the query to detect one or more new features for search engine 150 to train upon.

In operation 830, it is determined whether or not a new feature was detected in operation 825. If a new feature was been detected, then in operation 835 search engine 150 can generate a predictor for the new feature, or extend an existing predictor with the new feature and train upon the new feature using the new or extended predictor. Otherwise, operation 830 branches to operation 845.

In operation 840, search engine 150 can optionally transmit the new or extended predictor to one or more client devices 100 with instructions that each client device 100 train upon the new or extended predictor. In an embodiment, search engine 150 can optionally instruct the one or more client devices to report progress in training upon the new or extended predictor.

In operation 845, search engine 150 can transmit aggregated search results to client device 100 in response to the query received in operation 805.

Figure 9:
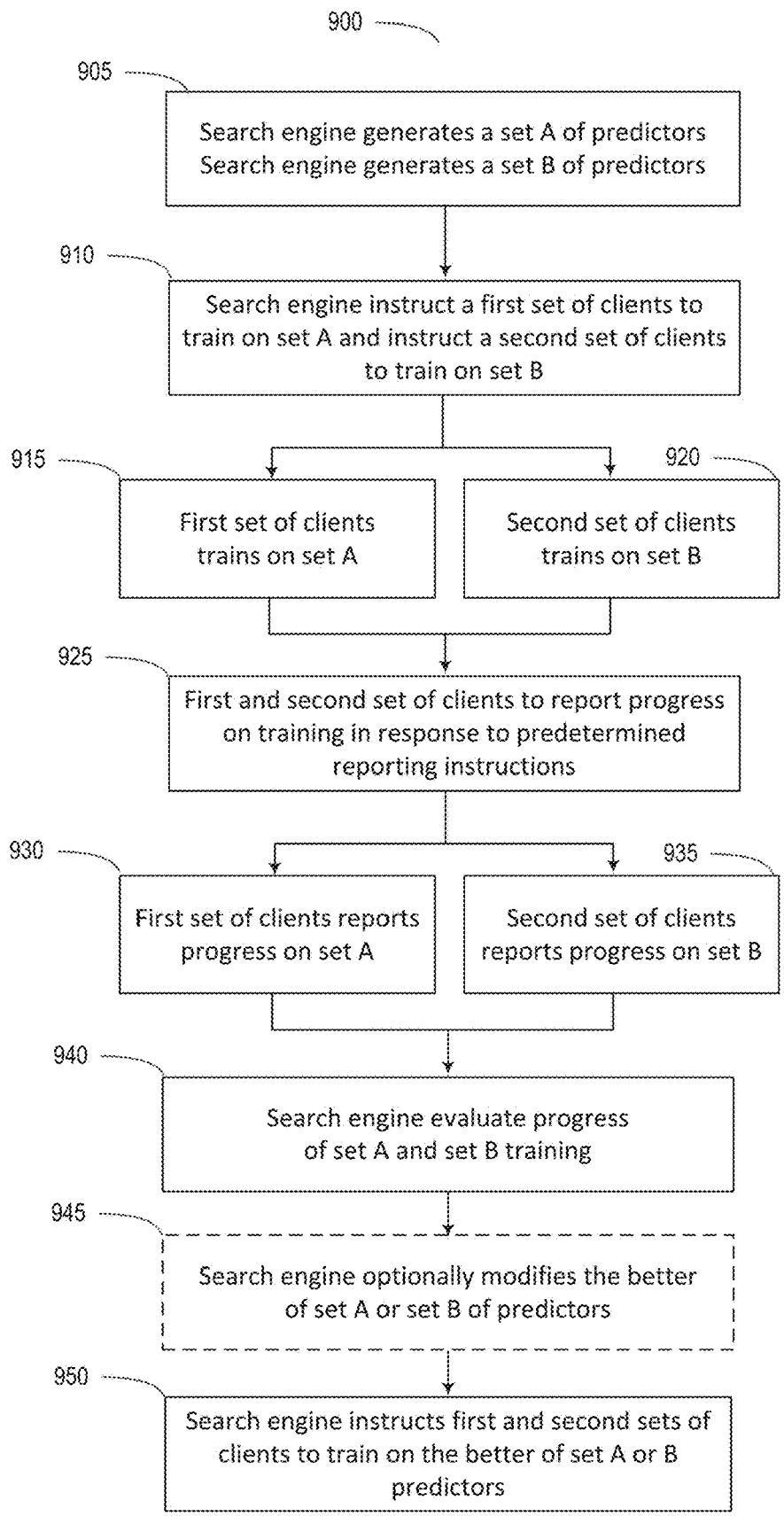
FIG. 9 illustrates, in block diagram form, a method of performing a comparison test of two sets of predictors on two different sets of clients.

FIG. 9 illustrates, in block diagram form, a method 900 of performing a comparison test of two sets of predictors on two different sets of client devices 100.

In operation 905, search engine 150 can generate a set "A" of predictors and a set "B" of predictors. Sets A and B of predictors each have at least one predictor in the set. Sets A and B of predictors can have a differing number of predictors.

In operation 910, search engine 150 can transmit set A of predictors to a first set of client devices 100 with instructions that the client devices 100 in the first set each train upon the predictors in set A. Search engine 150 can transmit set B of predictors to a second set of client devices 100 with instructions that the client devices 100 in the second set each train upon the predictors in set B. In an embodiment, first and second sets of client devices 100 can overlap. In an embodiment, first and second sets of client devices 100 each contain one client device 100.

In operation 915, the first set of clients trains upon set A of predictors. In operation 920, the second set of clients trains upon set B of predictors. Operations 915 and 920 can start at different times. Operations 915 and 920 can run for different durations. In an embodiment, training duration can be determined by each client device 100 processing a predetermined number of substantially similar queries. In an embodiment, training duration can be determined by a predetermined period of time. In an embodiment, training duration can continue until a predetermined event or criteria is met. A predetermined event can be search engine 150 requesting a training progress report from one or more of the client devices 100 in a set of client devices 100. A predetermined criteria can be training until a predictor achieves a fit to the feedback history data of a particular value, e.g. a normalized value of 0.65, indicating that a user frequently interacts with the query results presented to the user using the predictor. A predetermined criteria can be training for a predetermined minimum amount of time, or predetermined minimum number of substantially similar queries, and failing to achieve a fit to the feedback history data higher than a particular value, e.g. a normalized value of 0.15, indicating that a user does not often interact with the query results presented to the user using the predictor.

In operation 925, search engine 150 can instruct the first and second set of client devices 100 to report training progress on set A and set B of predictors, respectively, in response to predetermined reporting instructions. In an embodiment, the first and second sets of client devices 100 can report training progress to search engine 150 in response to one or more instructions to search engine 150 requesting a report on training progress. In an embodiment, client devices 100 can report training progress to search engine 150 at the end of the training duration of the respective sets A and B of predictors. First and second sets of client devices 100 can report training progress at different times.

In operation 930, the first set of client devices 100 can report training progress on set A of predictors to search engine 150. In operation 935, the second set of client devices 100 can report training progress on set B of predictors to search engine 150. Reporting progress on training of a set of predictors can include, for each predictor, identifying the set (A or B), an identifier of the particular predictor, training statistics, such as a number of queries processed, number of results presented and results the user engaged with, abandoned, etc., or a value representing the fit of the predictor to the relevant feedback history of the client. The fit value can be normalized.

In operation 940, search engine 150 can evaluate the training progress reported by the first and second sets of clients for sets of predictors A and B, respectively. Search engine 150 can determine one or more predictors from sets A or B, or both, that perform up to a predetermined standard. In an embodiment, the predetermined standard can include achieving a predetermined average fit value of a predictor to user feedback history over a predetermined number of client devices 100. In an embodiment, the predetermined standard can be achieving a better average fit value of a predictor to user feedback history over a predetermined number of client devices 100 than a previous fit value achieved by the client device 100 for a different predictor.

In operation 945, search engine 150 can optionally modify one or more predictors from set A or set B, whichever set produced better progress. Modifying a predictor can include adding a feature to a predictor (extending the predictor), deleting a feature from a predictor, or changing one or more values of a predictor. Values can be text, numbers, or both.

In operation 950, search engine 150 can instruct first and second sets of client devices 100 to train on set A or set B of predictors, as optionally modified in operation 945.

Operations in method 900 can be performed in a different order than as described above. Operations in method 900 can be performed iteratively, such that search engine 150 continuously improves its ability to return query results that users engage with. One or more operations of method 900, such as evaluating progress on training of predictors and modifying predictors, can be performed by search engine system engineers.

Figure 10:
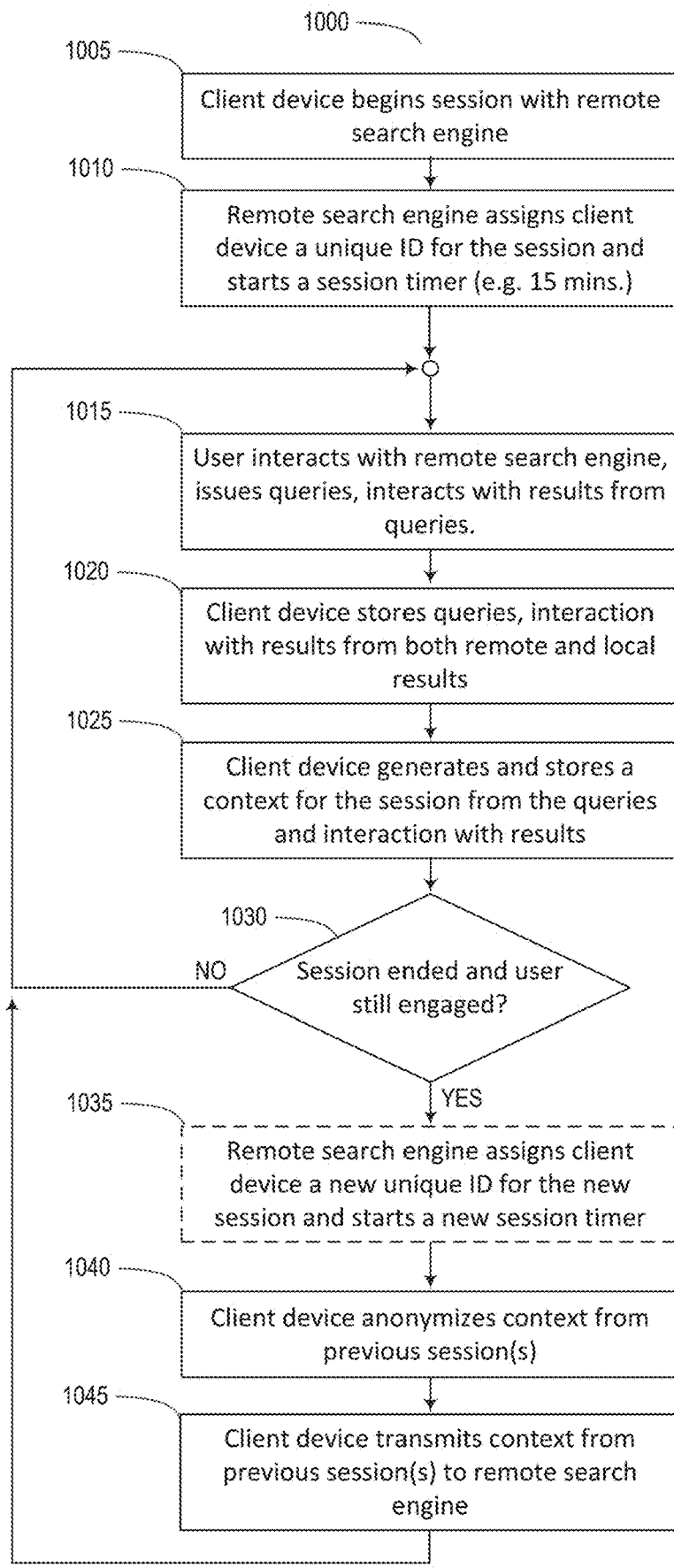
FIG. 10 illustrates, in block form, a method of preserving the intent, or context, of a session between a client device and a search engine across multiple sessions between the client device and search engine.

FIG. 10 illustrates, in block form, a method 1000 of preserving the intent, or context, of a search query session between a client device 100 and a remote search engine 150 across multiple sessions between client device 100 and search engine 150. A remote search engine 150 is a search engine, as is known in the art, is not located on the client device 100, and is generally accessed across a network 140, hence the name "remote" search engine 150. In the description of this method, remote search engine and search engine are used interchangeably.

Context refers to information about previous interaction by a user of a client device 100 with a search engine 150. The context information is used for continuity between sessions of a client device 100 with a search engine 150. Sessions can mean a first and a second session between a client device 100 and search engine 150 with little, or no, time having passed between the first and second session. Sessions can also mean a first session which ended at a first time and second session which started at a second time with some, or substantial, time having passed between sessions. Context information essentially provides continuity, or a bridge, between what a user was doing during a first session and what a user may resume doing in a second session. For example, in a first session, a user may have been search for karaoke bars open at 8 p.m. this Friday night in San Rafael, Calif. A search engine session time may expire, ending the first session, or a user may leave the client device 100, and return later to the client device 100 and resume searching for karaoke bars in a second, different session. Providing context information from the first session to the search engine 150 for the second session allows a user to resume searching for karaoke bars open at 8 p.m. this Friday night in San Rafael, Calif., as though there had been only one session.

In operation 1005, client device 100 begins interacting with search engine 150. Client device 100 interacting with search engine 150 can include logging on an account that permits access to search engine 150, navigating to a Uniform Resource Locator (URL) that accesses a web page of search engine 150, issuing a query to search engine 150, interacting with links or URLs on a web page of search engine 150, or interacting with results returned from a query to search engine 150. Search engine 150 can initiate a session between client device 100 and search engine 150, in response to client device 100 interacting with search engine 150.

In operation 1010, search engine 150 can assign a unique session identifier (session ID) to the session between client device 100 and search engine 150. In an embodiment, search engine 150 can start a session timer associated with the client device 100, session, and session ID. The session timer can be set to, e.g., 15 minutes. When the session time expired, the session expires.

In operation 1015, client device 100 continues interacting with search engine 150, as described in operation 1005.

In operation 1020, client device 100 stores queries issued by client device. Client device 100 also stores interaction data by the user of client device 100 with query results returned from queries issued by client device 100. Query results can include results returned from a local database 115 on client device 100, and can further include results returned from search engine 150. Queries and interaction data can be stored by client device 100 in local search and feedback history database 115.

In operation 1025, client device 100 can generate and store a context for the client device session with search engine 150. Storing a context for a session can include tagging queries and user feedback data stored in local search and feedback history 115 with the session ID. Storing context can further include storing information that identifies the session, such as session ID, current date, start time of the session, or IP address or home page of search engine 150 or other identifying search engine 150.

In operation 1030, it is determined whether the current session between client device 100 and search engine 150 has expired or otherwise ended. A session can expire when the session timer for the current session expires. Expiring a session can help keep search engine 150 from collecting too much information about a particular user—even if the user is not identified with specificity—to preserve privacy of the particular user. A session can end when a user logs out from a search engine 150, closes an internet browser used to access search engine 150, navigates away from the search engine 150 web page, turns off client device 100, or otherwise disengages from search engine 150.

If the session timer has expired and a user is still engaging with search engine 150, then in operation 1035, search engine 150 can generate a new session ID that is not associated by search engine 150 with the previous session ID. Search engine 150 can start a new distinct session, and not associate the new session with the first session. Client device 100 can receive the new session ID.

In operation 1040, client device 100 can anonymize context information stored in local search and feedback history database 115. Anonymization can be performed by anonymization and location fuzzing service 117.

In operation 1045, client device 100 can transmit the anonymized context information from one or more previous sessions to search engine 150. In an embodiment, client device 100 transmits the anonymized context information to search engine 150 in response to receiving a new session ID. In an embodiment, client device 100 transmits context information from one or more previous sessions to a different search engine 150 than the search engine 150 of the one or more previous sessions. This allows a user to search for the same information on a different search engine 150 without re-entering all previous queries of the previous one or more sessions. The method continues at operation 1015, with the user interacting with remote search engine 150.

Figure 11:
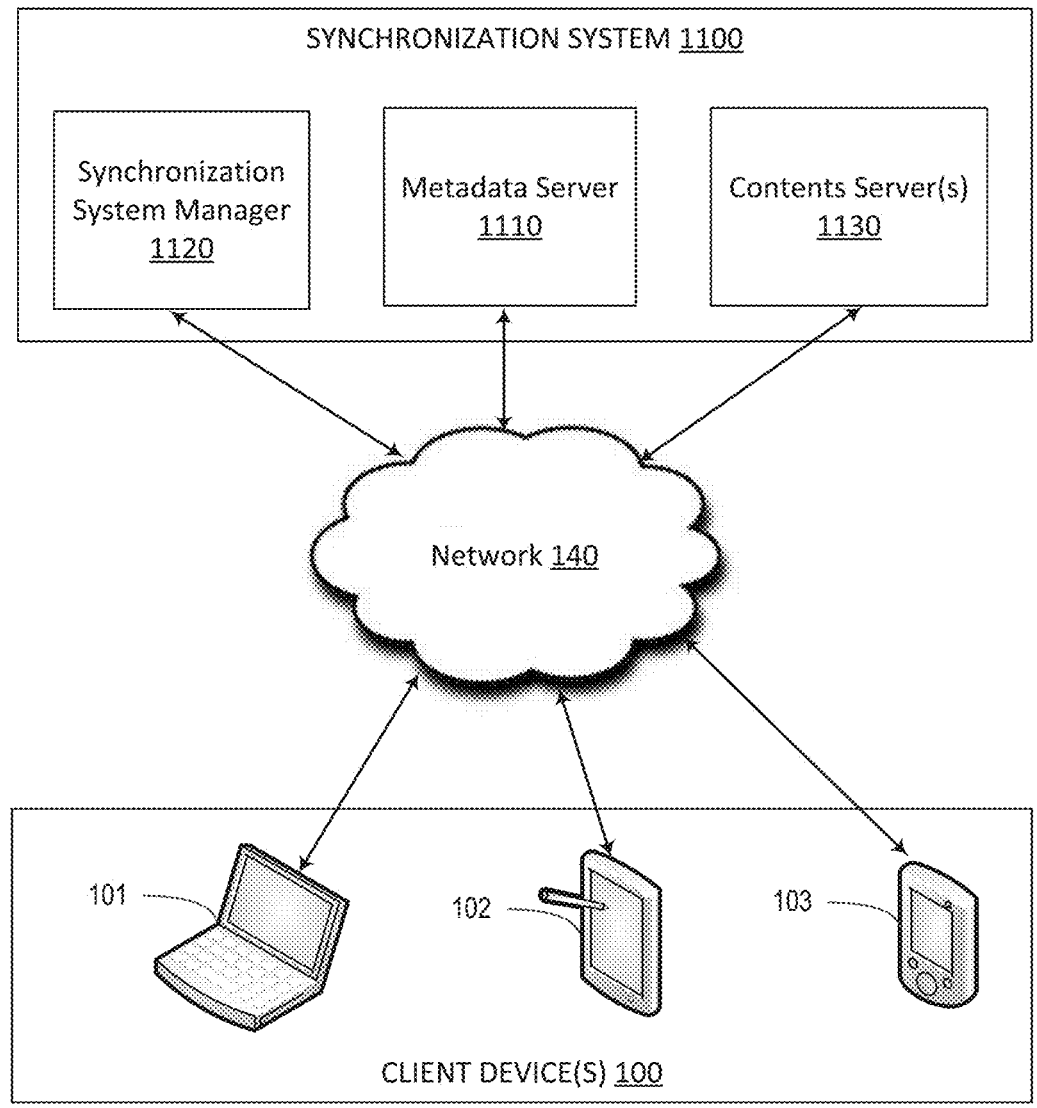
FIG. 11 illustrates, in block form, a system for synchronizing predictors across multiple devices of a user.

FIG. 11 illustrates, in block form, a system 1100 for synchronizing predictors across multiple client devices 100 of a user. In an embodiment, predictors can be stored on each client device 100 within local learning system 116. Thus synchronizing predictors can include synchronizing local learning system 116 for each client device 100. In an embodiment, synchronizing predictors across multiple devices can also include synchronizing local search and feedback history 115 across multiple client devices 100. Context between search sessions, as described with reference to FIG. 10, above, can be performed by synchronizing local search and feedback history 115 across multiple client devices. Synchronizing multiple client devices 100 can further include synchronizing local database 111 for multiple client devices 100. As described above, local database 111 can include data, metadata, and other information about applications 112 and data 113 on a client device 100. In an embodiment, only selected portions of local database 111 are synchronized between multiple client devices. The selected portions correspond to applications 112 and 113 which a user may have chosen to synchronize between multiple client devices 100.

Synchronization system 1100 can include a metadata server 1110 and one or more contents servers 1170. In one embodiment, a contents server 1170 can store one or more types of user data sets such as predictors, queries, user feedback history, data, metadata and indices. Another contents server 1170 can store, e.g., a contacts user data set, while still another content server 1170 can store emails of one or more email accounts of a user. In an embodiment, a content server 1170 can be a cloud storage service capable of storing a wide variety of different user data set types. In one embodiment, synchronization system 1100 can further include a synchronization management system 1160. Initially, client device 100 can store one or more user data sets from the file system of client device 100 on synchronization system 1100. A user data set, such as a predictors in local learning system 116 on client device 100, can be stored on the synchronization system 1100. In one embodiment, the user data set can be chunked into chunked data portions and stored on the one or more contents servers 1170. Metadata describing the user data set and metadata about the chunked portions of the user data set can be stored on the metadata server 1110 in a synchronization metadata database. In one embodiment, the metadata server 1110 and contents server 1170 can be managed using a synchronization management system 1160.

Managing the metadata server 1110 can include providing software to the metadata server 1110 to resolve conflicts between various versions of data sets of a user, including conflicts resulting from different versions of a software that generated a data set. For example, if one client device of a user, e.g. 101, has word processor software that is version 2.0, and the user generates a word processing document using that client device and software, and the document is later downloaded using the synchronization system 1100 to a different client device of the user, e.g. 102, having version 1.0 of the word processor software, the version 1.0 software may not be able to open and/or edit the document that was generated by software version 2.0. Synchronization system manager 1160 can provide software updates and patches to the metadata server 1110 to adapt the document for use with both version 1.0 and version 2.0 of the word processing software. Similarly, a predictor on a first client device 101 may utilize features that are not supported by a second client device 102, or have specifications that differ on the second client device 102. For example, client device 101 may have a predictor that utilizes a "location" feature based upon a GPS signal. Client device 102 may only be able to detect location by cell tower approximation, area code, or IP address. Synchronization system manager 1160 can modify the "location" feature in the predictor of client device 101 before synchronizing the predictor with client device 102. Alternatively, synchronization system manager 1160 can remove a feature from a predictor that is not supported by a target client device before synchronizing predictors. In an embodiment, a modified predictor and be flagged or otherwise marked as to the change made to a predictor before synchronization.

Synchronization system 1100 can be interfaced to the client device(s) 100 via a network 140. Network 140 can be the Internet, a wireless network, a cellular network, a local area network, or any combination of these. Although the synchronization system manager 1160, metadata server 1110, and contents server 1170 have been shown as separate elements, connected via a network 140, this need not be the case. One or more of the synchronization system manager system 1160, metadata server 1110, or contents server 1710 can be implemented on the same host computer system or on several physically distributed computer systems. In addition, as described above, contents server 1170 can include one or more content servers 1170, any or all of which can store one or more types of user data sets. Communication between one or more of the synchronization system manager 1160, metadata server 1110, and contents server(s) 1170 can be by sockets, messages, shared memory, an application program interface (API), interprocess communication, or other processing communication service. Application programming interfaces are described in detail, below, with reference to FIG. 12.

A client device 100 can include a desktop computer system, a laptop computer system such as client device 101, a tablet computer system such as client device 102, a cellular telephone such as client device 103, a personal digital assistant (PDA) including cellular-enabled PDAs, a set top box, an entertainment system, a gaming device, or other consumer electronic device. The components of a client device 100 are described in detail, below, with reference to FIG. 13.

A user data set can include one or more of: a predictor, a local search and feedback history database 115, a local database 111, a data file, a folder or directory, a word processing document, a spreadsheet, a presentation, emails, texts, user contacts, bookmarks, assets such as music, movies, and other purchased content, device settings, and application settings. Each of these can be a user data set. A user of a client device 100 can determine, on a per-device basis, whether a particular data set will, or will not, be synchronized with other of the user's client devices 100 using the synchronization system 1100.

Metadata about user data sets can include file system metadata and synchronization metadata. File system metadata can include a file ID, such as a POSIX file ID, a document ID, a creation date of the file, a date that the file was last modified, an identifier of the device that last modified the file, an identifier of the application and version of the application that modified the file, and a generation count for the file. For assets, such as purchased content that are already stored remotely at a service such as iTunes® or Amazon Cloud®, metadata about the content can include a Universal Resource Locator (URL) that points to where the content is located. File system metadata can be generated by the file system of each client device 100. Synchronization metadata can include a universally unique identifier (UUID) for a file or a directory that is unique across the client devices 100 of a user, and can further include ETAGS. ETAGS can specify a specific version of the metadata for a document or a directory. ETAGS can be generated by the synchronization system 100 to manage the user data sets and resolve conflicts between differing generations of user data for a particular user data set. For example, an ETAG can be used to distinguish different generations of a word processing document of the resume of the user.

Figure 12:
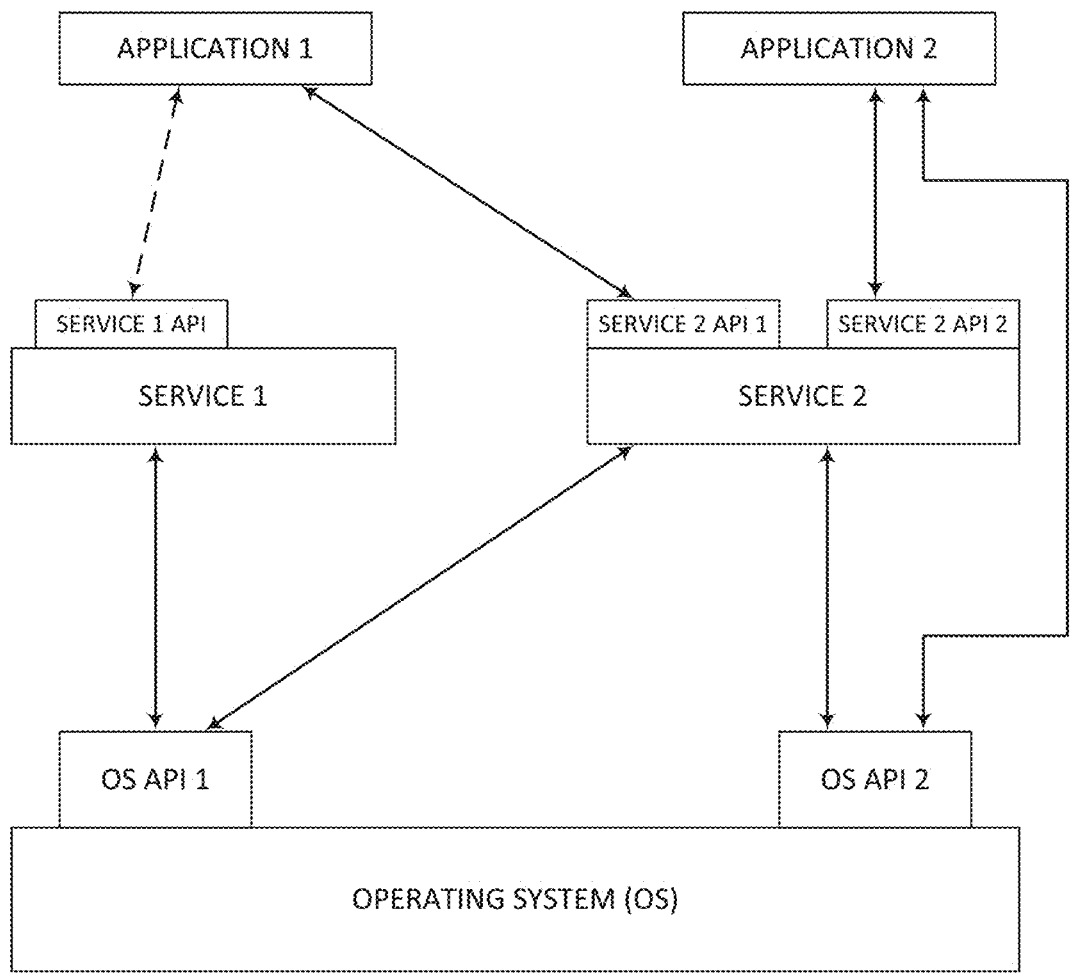
FIG. 12 illustrates an exemplary embodiment of a software stack usable in some embodiments of the invention.

In FIG. 12 ("Software Stack"), an exemplary embodiment, applications can make calls to Services A or B using several Service APIs and to Operating System (OS) using several as APIs, A and B can make calls to as using several as APIs.

Note that the Service 2 has two APIs, one of which (Service 2 API 1) receives calls from and returns values to Application 1 and the other (Service 2 API 2) receives calls from and returns values to Application 2, Service 1 (which can be, for example, a software library) makes calls to and receives returned values from OS API 1, and Service 2 (which can be, for example, a software library) makes calls to and receives returned values from both as API 1 and OS API 2, Application 2 makes calls to and receives returned values from as API 2.

Figure 13:
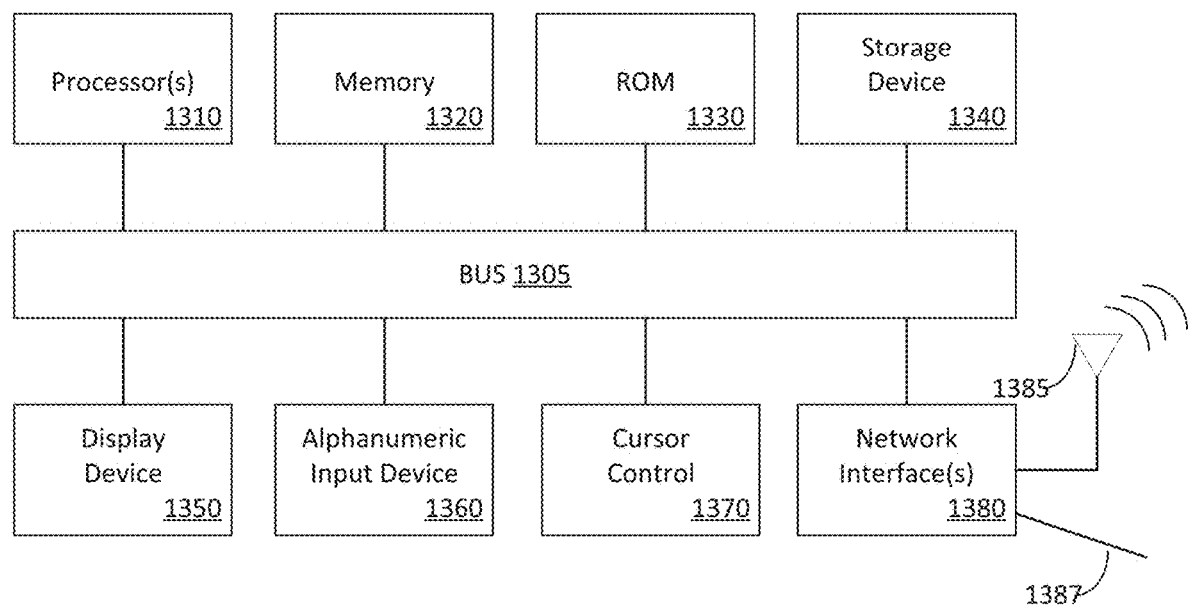
FIG. 13 is a block diagram of one embodiment of a computing system.

FIG. 13 is a block diagram of one embodiment of a computing system 1300. The computing system illustrated in FIG. 13 is intended to represent a range of computing systems (either wired or wireless) including, for example, desktop computer systems, laptop computer systems, cellular telephones, personal digital assistants (PDAs) including cellular-enabled PDAs, set top boxes, entertainment systems or other consumer electronic devices. Alternative computing systems may include more, fewer and/or different components. The computing system of FIG. 13 may be used to provide the computing device and/or the server device.

Computing system 1300 includes bus 1305 or other communication device to communicate information, and processor 1310 coupled to bus 1305 that may process information.

While computing system 1300 is illustrated with a single processor, computing system 1300 may include multiple processors and/or co-processors 1310. Computing system 1300 further may include random access memory (RAM) or other dynamic storage device 1320 (referred to as main memory), coupled to bus 1305 and may store information and instructions that may be executed by processor(s) 1310. Main memory 1320 may also be used to store temporary variables or other intermediate information during execution of instructions by processor 1310.

Computing system 1300 may also include read only memory (ROM) and/or other static storage device 1340 coupled to bus 1305 that may store static information and instructions for processor(s) 1310. Data storage device 1340 may be coupled to bus 1305 to store information and instructions. Data storage device 1340 such as flash memory or a magnetic disk or optical disc and corresponding drive may be coupled to computing system 1300.

Computing system 1300 may also be coupled via bus 1305 to display device 1350, such as a cathode ray tube (CRT) or liquid crystal display (LCD), to display information to a user. Computing system 1300 can also include an alphanumeric input device 1360, including alphanumeric and other keys, which may be coupled to bus 1305 to communicate information and command selections to processor(s) 1310. Another type of user input device is cursor control 1370, such as a touchpad, a mouse, a trackball, or cursor direction keys to communicate direction information and command selections to processor(s) 1310 and to control cursor movement on display 1350.

Computing system 1300 further may include one or more network interface(s) 1380 to provide access to a network, such as a local area network. Network interface(s) 1380 may include, for example, a wireless network interface having antenna 1385, which may represent one or more antenna(e). Computing system 1200 can include multiple wireless network interfaces such as a combination of WiFi, Bluetooth® and cellular telephony interfaces. Network interface(s) 1380 may also include, for example, a wired network interface to communicate with remote devices via network cable 1387, which may be, for example, an Ethernet cable, a coaxial cable, a fiber optic cable, a serial cable, or a parallel cable.

In one embodiment, network interface(s) 1380 may provide access to a local area network, for example, by conforming to IEEE 802.11 b and/or IEEE 802.11 g standards, and/or the wireless network interface may provide access to a personal area network, for example, by conforming to Bluetooth standards. Other wireless network interfaces and/ or protocols can also be supported. In addition to, or instead of, communication via wireless LAN standards, network interface(s) 1380 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A computer-implemented method, comprising:
in response to a query issued by a user of a client device, receiving, by the client device, query results from a local database, query results from a remote search engine, receiving a feature related to the query from the remote search engine, and receiving an instruction from the remote search engine to perform training on the feature on the client device;
modifying, by the client device, a predictor on the client device to include the feature related to the query received from the remote server wherein the feature comprises an input that provides data to train the predictor on the feature received from the remote search engine;
training the predictor, by the client device, on the feature using interaction with the query results from the local database and query results from the remote search engine;
in response to a search system of the client device receiving a subsequent query issued by the user of the client device, using, by the client device, the predictor to extend or bias the subsequent query before submitting the subsequent query to the local database on the client device and remote search engine, wherein the interaction with query results used to train the predictor on the feature on the client device is retained on the client device as private information and the private information is not transmitted to the remote search engine; and transmitting, by the client device to the remote search engine, data representing progress of the training of the predictor having the received feature, wherein data representing progress of the training comprises an indication of an increase in a number of query results that the user interacts with for a substantially identical query issued after modifying the predictor to include the feature, and the data representing the progress is anonymized by the client device before the transmitting to the remote search engine.

2. The method of claim 1, wherein the local database resides on the client device and indexes information in user data files stored on the client device, such that query results returned from the local database include information stored in user data files on the client device matching the query, and the local query results are retained on the client device as private user information.

3. The method of claim 1, wherein modifying the predictor to include the feature comprises:
replacing a feature in an existing predictor with the received feature.

4. The method of claim 1, further comprising:
receiving and storing, by the client device, user interaction data representing interaction by a user of the client device with one or more of the query results, and retaining the user interaction data on the client device as private user information that is not transmitted to the remote search engine.

5. The method of claim 4, further comprising:
anonymizing, by the client device, at least a portion of the interaction data with query results; and
transmitting, by the client device to the remote search engine, the anonymized at least a portion of the user interaction data.

6. The method of claim 5, wherein anonymizing the user interaction with query results includes obscuring a location of the client device.

7. The method of claim 4, wherein training on the feature comprises the client device using machine learning to determine a relationship between the query, the feature, and one or more of the query results interacted with by the user.

8. The method of claim 7, wherein the feature comprises an input to the predictor that provides data to train the predictor.

9. The method of claim 2, wherein the another query result is a local query result obtained from a local database on the client device.

10. A non-transitory computer-readable medium programmed with instructions that, when executed by a processing system on a client device, perform operations comprising:
in response to a query issued by a user of a client device, receiving, by the client device, query results from a local database, query results from a remote search engine, receiving a feature related to the query from the remote search engine, and receiving an instruction from the remote search engine to perform training on the feature on the client device;
modifying, by the client device, a predictor on the client device to include the feature related to the query received from the remote server, wherein the feature comprises an input that provides data to train the predictor on the feature received from the remote search engine;
training the predictor, by the client device, on the feature using interaction with the query results from both the local database and query results from the remote search engine;
in response to a search system of the client device receiving a subsequent query issued by the user of client device, using, by the client device, the predictor to extend or bias the subsequent query before submitting the subsequent query to the local database on the client device and remote search engine, wherein the interaction with query results used to train the predictor on the feature on the client device is retained on the client device as private information and the private information is not transmitted to the remote search engine; and
transmitting, by the client device to the remote search engine, data representing progress of the training of the predictor having the received feature, wherein data representing progress of the training comprises an indication of an increase in a number of query results that the user interacts with for a substantially identical query issued after modifying the predictor to include the feature, and the data representing the progress is anonymized by the client device before the transmitting to the remote search engine.

11. The medium of claim 10, wherein the wherein the local database resides on the client device and indexes information in user data files stored on the client device, such that query results returned from the local database include information stored in user data files on the client device matching the query, and the local query results are retained on the client device as private user information.

12. The medium of claim 10, wherein modifying the predictor to include the feature comprises replacing a feature in an existing predictor with the received feature.

13. The medium of claim 10, the operations further comprising:
receiving and storing, by the client device, user interaction data representing interaction by a user of the client device with one or more of the query results, and retaining the user interaction data on the client device as private user information that is not transmitted to the remote search engine.

14. The medium of claim 13, the operations further comprising:
anonymizing, by the client device, at least a portion of the interaction data with query results; and
transmitting, by the client device to the remote search engine, at least a portion of the user interaction data.

15. The medium of claim 14, wherein anonymizing the user interaction with query results includes obscuring a location of the client device.

16. The medium of claim 13, wherein training on the feature comprises using machine learning to determine a relationship between the query, the feature, and one or more of the query results interacted with by the user, and the feature comprises an input to the predictor that provides data to train the predictor.

17. The medium of claim 11, wherein the another query result is a local query result obtained from a local database on the client device.

18. A client device comprising a processing system and a memory programmed with executable instructions that, when executed, perform operations comprising:

in response to a query issued by a user of a client device, receiving, by the client device, query results from a local database, query results from a remote search engine, receiving a feature related to the query from the remote search engine, and receiving an instruction from the remote search engine to perform training on the feature on the client device;

modifying, by the client device, a predictor on the client device to include the feature related to the query received from the remote server, wherein the feature comprises an input that provides data to train the predictor on the feature received from the remote search engine;

training the predictor, by the client device, on the feature, using interaction with the query results from the local database and query results from the remote search engine;

in response to a search system of the client device receiving a subsequent query issued by the user of the client device, using, by the client device, the predictor to extend or bias the subsequent query before submitting the subsequent query to the local database on the client device and remote search engine, wherein the interaction with query results used to train the predictor on the feature on the client device is retained on the client device as private information and the private information is not transmitted to the remote search engine; and transmitting, by the client device to the remote search engine, data representing progress of the training of the predictor having the received feature, wherein data representing progress of the training comprises an indication of an increase in a number of query results that the user interacts with for a substantially identical query issued after modifying the predictor to include the feature, and the data representing the progress is anonymized by the client device before the transmitting to the remote search engine.

19. The device of claim 18, wherein the local database resides on the client device and indexes information in user data files stored on the client device, such that query results returned from the local database include information stored in user data files on the client device matching the query, and the local query results are retained on the client device as private user information.

20. The device of claim 18, wherein modifying the predictor to include the feature comprises replacing a feature in the existing predictor with the received feature.

21. The device of claim 18, further comprising:
receiving and storing, by the client device, user interaction data representing interaction by a user of the client device with one or more of the query results, and retaining the user interaction data on the client device as private user information that is not transmitted to the remote search engine;

anonymizing, by the client device, at least a portion of the interaction data with query results; and transmitting, by the client device to the remote search engine, the anonymized at least a portion of the user interaction data.

22. The device of claim 21, wherein anonymizing the user interaction with query results includes obscuring a location of the client device.

23. The method of claim 1, further comprising:
determining, by the client device, that there is insufficient data present on the client device for a local predictor; and removing at least one feature from the local predictor, in response to the determining that there is insufficient data.

\* \* \* \* \*